(12) United States Patent
Rao et al.

(10) Patent No.: US 10,447,420 B2
(45) Date of Patent: Oct. 15, 2019

(54) METHOD AND SYSTEM FOR SIGNALING DEFECTS IN A NETWORK ELEMENT WITH OPTICAL FABRIC

(71) Applicant: Infinera Corporation, Sunnyvale, CA (US)

(72) Inventors: Rajan Rao, Fremont, CA (US); Nikhil Kumar Satyarthi, Bangalore (IN); Parveen Kumar Gupta, Bangalore (IN); Sowmya Mahadevaiah, Parsipanny, NJ (US); Sanjeev Ramachandran, Bangalore (IN); Baranidhar Ramanathan, Bangalore (IN); Ramakrishnan Subramanian, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/614,205

(22) Filed: Jun. 5, 2017

(65) Prior Publication Data

US 2017/0353264 A1 Dec. 7, 2017

Related U.S. Application Data

(60) Provisional application No. 62/345,017, filed on Jun. 3, 2016.

(51) Int. Cl.
*H04J 14/02* (2006.01)
*H04J 14/00* (2006.01)

(52) U.S. Cl.
CPC ...... *H04J 14/0221* (2013.01); *H04J 14/0212* (2013.01); *H04J 14/0275* (2013.01); *H04J 14/00* (2013.01); *H04J 14/02* (2013.01)

(58) Field of Classification Search
CPC .............. H04J 14/0221; H04J 14/0212; H04J 14/0275; H04J 14/02; H04J 14/00
(Continued)

(56) References Cited

U.S. PATENT DOCUMENTS 4,701,907 A * 10/1987 Collins ................. H04Q 11/06
398/46
6,577,652 B1 * 6/2003 Kamata ............... H04J 14/0212
370/534

(Continued)

*Primary Examiner* — Dibson J Sanchez
(74) *Attorney, Agent, or Firm* — David L. Soltz

(57) ABSTRACT

Embodiments include methods and apparatuses for providing at least one signaling indication of a super-channel by a power controller in a Wavelength Division Multiplexing (WDM) system. The power controller may receive a service provisioning and a lock state from a network management entity. The power controller may receive, from an optical fabric unit, a fabric state that indicates whether a pass-band of the super-channel is provisioned. The power controller may receive the power level of the super-channel from a power monitoring unit. Based on the power level and attenuation level of the super-channel, the power controller may determine a ramp state that indicates whether the power level reached to a predetermined power. The power controller may determine an alarm state based on the power level. The power controller may determine the signaling indication based on the service provisioning, lock, fabric, ramp, and alarm states.

23 Claims, 15 Drawing Sheets

(58) Field of Classification Search
USPC .................................................. 398/43–103
See application file for complete search history.

(56) References Cited

U.S. PATENT DOCUMENTS

| | | | | |
|---|---|---|---|---|
| 6,594,047 | B1* | 7/2003 | Ballintine | H04J 14/0227 398/79 |
| 6,674,754 | B1* | 1/2004 | Ofek | H04L 47/28 398/51 |
| 6,714,697 | B2* | 3/2004 | Fukashiro | H04Q 11/0005 385/15 |
| 6,724,953 | B2* | 4/2004 | Asahi | H04Q 11/0005 385/17 |
| 7,248,759 | B2* | 7/2007 | Ishizuka | G02B 6/3588 385/16 |
| 7,277,606 | B1* | 10/2007 | Sakai | G02B 6/359 385/17 |
| 7,542,675 | B1* | 6/2009 | Graves | H04Q 11/0005 398/45 |
| 8,554,070 | B2* | 10/2013 | Ueki | H04B 10/506 398/182 |
| 2002/0021463 | A1* | 2/2002 | Turner | H04B 10/077 398/79 |
| 2002/0141009 | A1* | 10/2002 | Yu | H04B 10/07953 398/9 |
| 2002/0149815 | A1* | 10/2002 | Schafer | H04Q 11/0005 398/56 |
| 2002/0154359 | A1* | 10/2002 | Tsuda | H04B 10/2942 359/337.13 |
| 2003/0081283 | A1* | 5/2003 | Ishizuka | H04Q 11/0005 398/79 |
| 2003/0099475 | A1* | 5/2003 | Nemoto | H04J 14/0212 398/83 |
| 2003/0128979 | A1* | 7/2003 | Kitajima | H04B 10/0793 398/12 |
| 2004/0008988 | A1* | 1/2004 | Gerstal | H04B 10/032 398/45 |
| 2004/0022539 | A1* | 2/2004 | Bannister | H04Q 11/0005 398/55 |
| 2004/0047548 | A1* | 3/2004 | Okumura | G02B 6/359 385/18 |
| 2004/0109694 | A1* | 6/2004 | Suzuki | H04B 10/2931 398/177 |
| 2004/0179845 | A1* | 9/2004 | Yamashita | H04J 14/0201 398/83 |
| 2006/0222361 | A1* | 10/2006 | Aoki | H04Q 11/0005 398/51 |
| 2006/0269284 | A1* | 11/2006 | Fujita | H04B 10/077 398/38 |
| 2007/0212067 | A1* | 9/2007 | Miyazaki | H04J 14/0227 398/57 |
| 2008/0080865 | A1* | 4/2008 | Muro | H04J 14/0204 398/83 |
| 2008/0095537 | A1* | 4/2008 | Sakamoto | H04B 10/0775 398/83 |
| 2008/0131116 | A1* | 6/2008 | Nakamura | H04B 10/07955 398/34 |
| 2008/0240710 | A1* | 10/2008 | Nishioka | H04B 10/03 398/5 |
| 2009/0028502 | A1* | 1/2009 | Presley | G02B 6/29385 385/18 |
| 2009/0041456 | A1* | 2/2009 | Kachita | H04B 10/07955 398/34 |
| 2009/0116834 | A1* | 5/2009 | Sugawa | H04J 14/0204 398/6 |
| 2009/0290870 | A1* | 11/2009 | Koyano | H04B 10/07955 398/25 |
| 2010/0150563 | A1* | 6/2010 | Nakajima | H04B 10/07955 398/81 |
| 2010/0322622 | A1* | 12/2010 | Shukunami | H04B 10/07953 398/26 |
| 2011/0081146 | A1* | 4/2011 | Nakajima | H04J 14/0204 398/48 |
| 2011/0150468 | A1* | 6/2011 | Uchida | H04J 3/1658 398/45 |
| 2012/0230681 | A1* | 9/2012 | Ueki | H04B 10/506 398/34 |
| 2012/0321300 | A1* | 12/2012 | Sueoka | H04B 10/07955 398/34 |
| 2013/0004164 | A1* | 1/2013 | Toscano | H04J 3/14 398/34 |
| 2013/0039647 | A1* | 2/2013 | Yamashita | H04B 10/0771 398/17 |
| 2013/0114953 | A1* | 5/2013 | Moynihan | H04B 10/032 398/5 |
| 2013/0121685 | A1* | 5/2013 | Rao | H04B 10/0773 398/17 |
| 2013/0251365 | A1* | 9/2013 | Sone | H04B 17/00 398/38 |
| 2013/0322867 | A1* | 12/2013 | Ibach | H04J 3/1652 398/2 |
| 2016/0094306 | A1* | 3/2016 | Nakajima | H04J 14/0212 398/82 |
| 2016/0241936 | A1* | 8/2016 | Nagamine | H04B 10/564 |
| 2016/0344481 | A1* | 11/2016 | Vassilieva | H04J 14/0221 |
| 2016/0352449 | A1* | 12/2016 | Honda | H04J 14/0221 |
| 2017/0117967 | A1* | 4/2017 | Morea | H04B 10/2941 |
| 2017/0201318 | A1* | 7/2017 | Yazar | H04B 10/03 |
| 2017/0338887 | A1* | 11/2017 | Rao | H04Q 11/0005 |
| 2018/0138973 | A1* | 5/2018 | Miyabe | H04B 10/795 |
| 2019/0007131 | A1* | 1/2019 | Satyarthi | G06F 3/0625 |

* cited by examiner

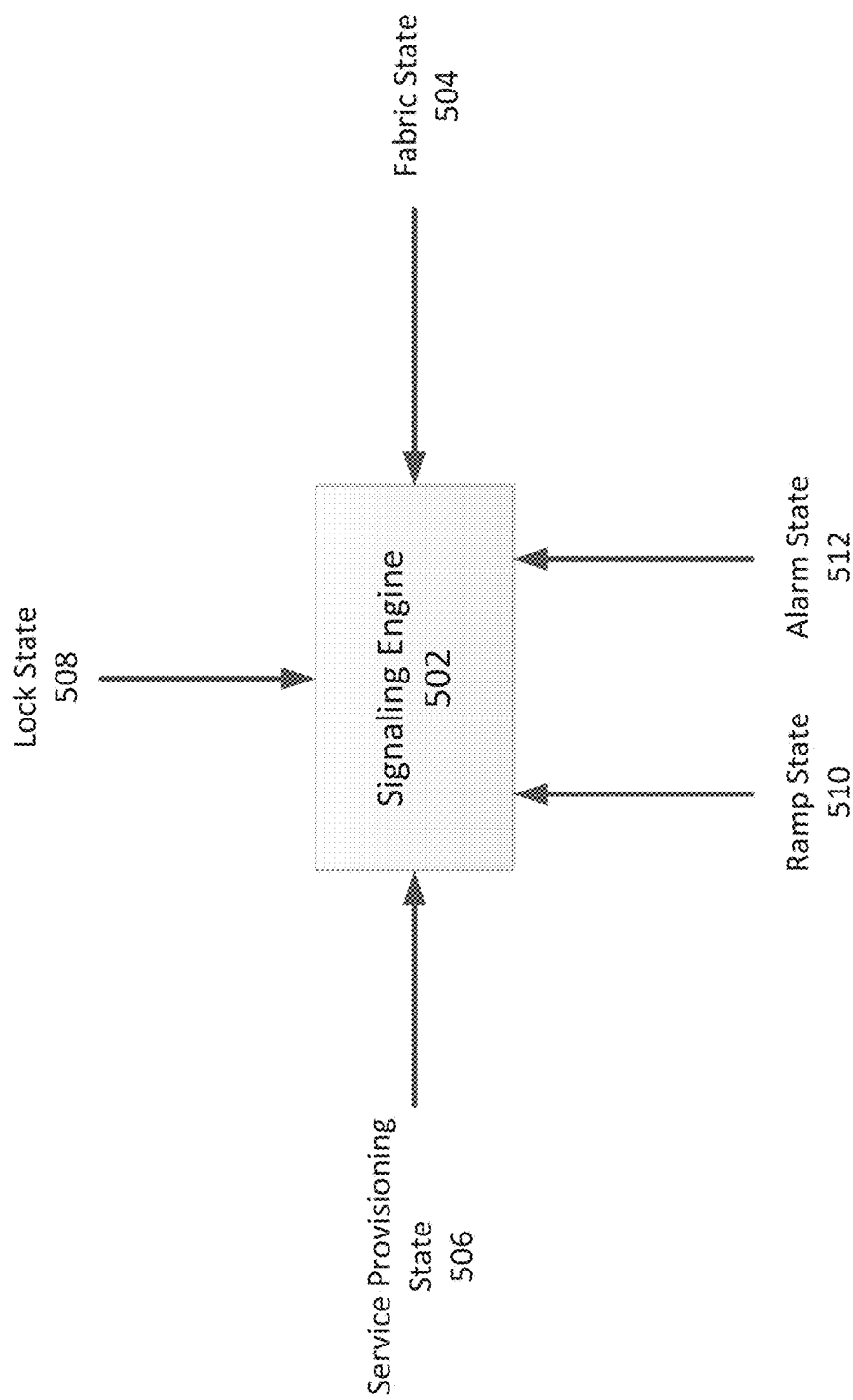

METHOD AND SYSTEM FOR SIGNALING DEFECTS IN A NETWORK ELEMENT WITH OPTICAL FABRIC

CROSS REFERENCE TO RELATED APPLICATION

This application claims the benefit of U.S. provisional application No. 62/345,017 filed on Jun. 3, 2016, which is incorporated by reference as if fully set forth herein.

FIELD OF INVENTION

The disclosed embodiments are generally directed to a Wavelength Division Multiplexing (WDM) system and more specifically to a power controller to provide signaling defect indications in the WDM system.

BACKGROUND

In fiber optic communications, Wavelength Division Multiplexing (WDM) is a technology which multiplexes a number of optical carrier signals received from light sources operating at different wavelengths onto a single optical fiber where the optical carrier signals are transported over long distance. At a drop location, the WDM also demultiplexes optical signals that are carried on a single optical fiber onto a number of optical carrier signals. A WDM system may have an optical add drop multiplexer (OADM) that does both multiplexing and demultiplexing simultaneously. The OADM typically includes an optical fabric such as a Wavelength Selective Switch (WSS) or Multicast Switch (MCS) device to make optical connections that enable light signals to flow across the optical fabric.

A process of setting an optical connection in the optical fabric may involve configuring a pass-band of an optical channel in the optical fabric followed by a gradual ramp process where the optical connection (e.g. the light flow across the optical fabric) is slowly brought up. This may involve a step wise power control process through attenuation control so that light coming out from the optical fabric is gradually launched on to the line fiber. However, once the pass band of the optical channel in the optical fabric is configured, the status of the pass-band may dynamically change depending on fault conditions, equipment conditions, or facility lock conditions. Moreover, there may be a high latency between the time of service provisioning by a network operator and the time of actual provisioning in an optical fabric because each optical connection in network elements is brought up in a serialized manner from the upstream to the downstream (i.e. an automatic link turn-up mechanism). Thus, it would be desirable to have a method and apparatus that provides signaling defects associated with the phased ramp process of the optical fabric to ensure the fault, equipment, and facility lock conditions to be appropriately handled in the optical communication network.

SUMMARY

A system and apparatus are disclosed herein for providing at least one signaling indication of a super-channel by a power controller in a WDM system. The power controller may receive, from a network management entity, a service provisioning state of the super-channel and a lock state of the super-channel. The service provisioning state may indicate whether there exists at least one association of multiple trail end-points for data flow of the super-channel. The lock state of the super channel may indicate whether the network management entity issued a lock command or an unlock command. The power controller may receive, from an optical fabric unit, a fabric state of the super-channel that indicates whether a pass-band of the super-channel is provisioned or not. The optical fabric unit may be a Wavelength Selective Switch (WSS). The power controller may receive, from a power monitoring unit, a power level of the super-channel at a line fiber in the WDM system. The power monitoring unit may be an Optical Power Monitor (OPM). The power controller may determine a ramp state based on the power level and an attenuation level of the super-channel. The ramp state may indicate whether the power level of the super-channel reached to a predetermined target launch power level. Based on the power level of the super channel, the power controller may determine an alarm state. The power controller may determine signaling indications of the super channel based on at least one of the service provisioning state, the lock state, the fabric state, the ramp state, or the alarm state. The power controller may transmit the signaling indications to an optical supervisory channel (OSC) control unit. The signaling indications may include an open connection indication (OCI), a lock indication (LCK), a forward defect indication (FDI), and a clear indication.

BRIEF DESCRIPTION OF THE DRAWINGS

A more detailed understanding may be had from the following description, given by way of example in conjunction with the accompanying drawings wherein:

FIG. 5 is a block diagram illustrating a signaling engine with five state variable inputs to provide at least one signaling indication of a super-channel;

DETAILED DESCRIPTION OF THE PREFERRED EMBODIMENTS

Figure 1A:
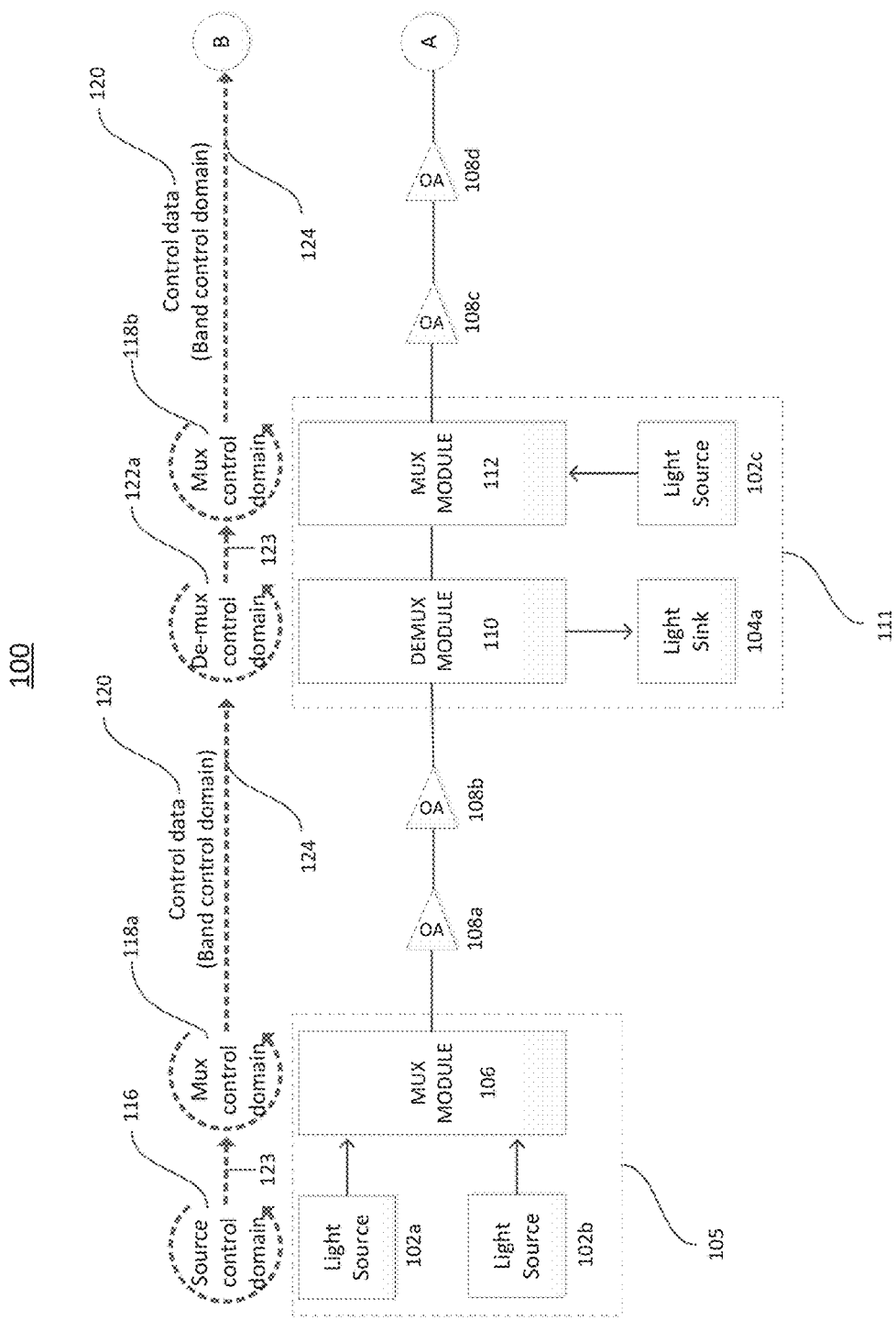
FIG. 1A is a system diagram of an example optical networking system in which one or more disclosed embodiments may be implemented.
Figure 1B:
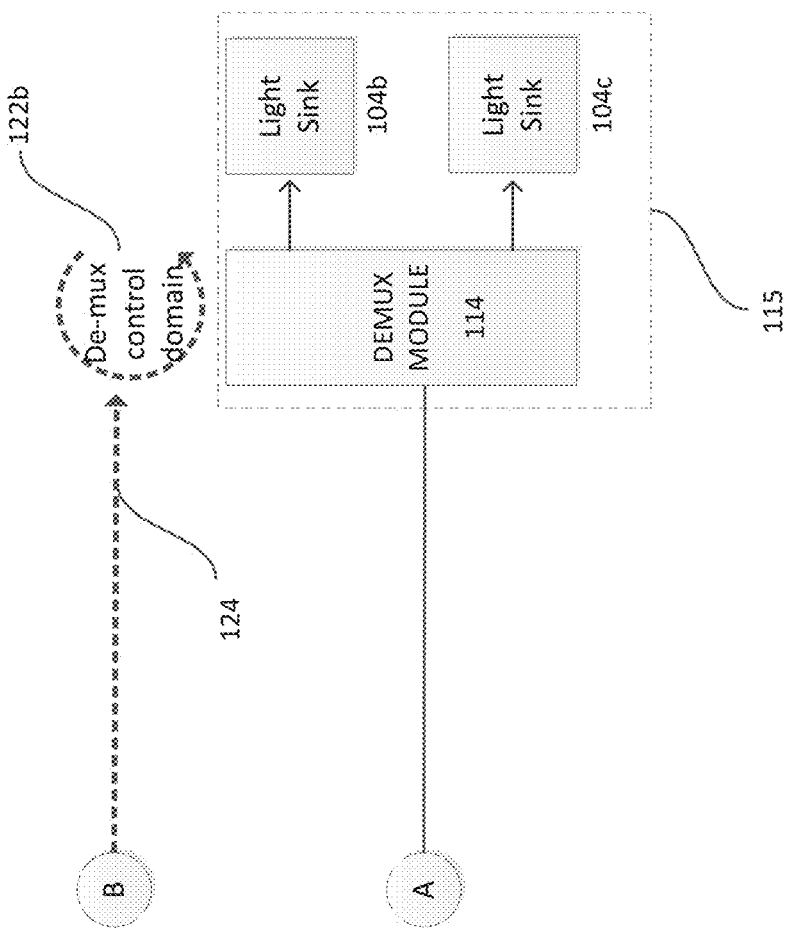
FIG. 1B is a continuation of FIG. 1A.

FIGS. 1A and 1B are a diagram of an example optical networking system 100 in which one or more disclosed embodiments may be implemented. The optical networking system 100 is a communication network which uses optical signals that encode digital information onto light in order to transmit vast amounts of data across network elements in the communication network. It may use fiber-optic cables, amplifiers, lasers, LEDs, and Wavelength Division Multiplexer (WDM) to transmit large quantities of data across the communication network.

As shown in FIG. 1, the optical networking system 100 may include light sources 102a, 102b, 102c, light sinks 104a, 104b, 104c, multiplexer modules 106, 112, demultiplexer modules 110, 114, and optical amplifiers 108a, 108b, 108c. 108d. Each of the light sources 102a, 102b, 102c may be any type of device configured to transmit light signals onto multiplexer modules 106, 112. The light signals originated from the light sources 102a, 102b, 102c may be from lasers or LEDs as examples. The light sources 102a, 102b, 102c are points where an optical layer or L0 layer may initiate in the optical networking system 100. In the light sources 102a, 102b, 102c, digital transport data may be modulated and/or mapped into optical channels for the multiplexer modules 106, 112. Similarly, each of the light sinks 104a, 104b, 104c may be any type of device configured to receive light signals from demultiplexer modules 110, 114. The light signals originated from the light sources 102a, 102b, 102c terminate at the light sinks 104a, 104b, 104c. In the light sinks 104a, 104b, 104c, a digital layer or L1 layer may initiate and optical signals may be demodulated and/or demapped into digital transport data for digital transport networks such as Synchronous Digital Hierarchy (SDH), Synchronous Optical Network (SONET), or Optical Transport Network (OTN). The light sources 102a, 102b, 102c and the light sinks 104a, 104b, 104c may be provided as one or more light cards/modules.

The light source 102a, 102b, 102c may transmit one or more super-channels. The light sinks 104a, 104b, 104c may receive one or more super-channels. The super-channel as used herein means a group of multiple optical carriers (e.g. multiple optical channels or multiple optical wavelengths) that are combined to create a unified channel of a higher data rate using wavelength division multiplexing (WDM). An optical carrier or optical channel is a group of wavelengths. The super-channel is formed by multiple optical carriers or optical channels that are sufficiently spaced not to cause interference among themselves.

The super-channel may be provisioned in an optical network as a single grouped entity for routing and signaling purposes. Specifically, the multiple optical carriers within a super-channel are routed together through the optical network and managed as though it included only one optical channel. The super-channel may be sourced from a single light source. The light source may be a single line card, a single chip, a single photonic integrated circuit (PIC) or the like that can generate one or more super-channels. When multiple super-channels are generated from light sources 102a, 102b, 102c, multiplexer modules 106, 112 may combine the multiple super-channels as input to transmit over an output fiber. Demultiplexer modules 110, 114 may separate the multiple super-channels and provide each super-channel to light sinks 104a, 104b, 104c.

Each of the multiplexer modules 106, 112 may be any type of device configured to select one of several input signals and forward the selected input signal into a single optical fiber. For example, the multiplexer modules 106, 112 may multiplex a number of optical carrier signals received from light sources 102a, 102b, 102c onto a single optical fiber. Similarly, each of the demultiplexer modules 110, 114 may be any type of device configured to take a single input line and select one of many output lines, which is connected to the single input. For example, the demultiplexer modules 110, 114 may demultiplex optical signals that are carried on a single optical fiber received from optical amplifiers 108b, 108d onto a number of optical carrier signals. The multiplexer modules 106, 112 and the demultiplexer module 110, 114 may be provided as one or more multiplexing/demultiplexing systems. The multiplexing/demultiplexing systems may include wavelength division multiplexing (WDM) systems, Coarse WDM (CWDM) systems, Dense WDM (DWDM) systems, Optical Add Drop Multiplexer (OADM), Reconfigurable Optical Add Drop Multiplexer (ROADM), Enhanced WDM (EWDM) systems, and the like.

Each of optical amplifiers 108a, 108b, 108c, 108d may be any type of device configured to amplify an optical signal without the need to convert it to an electrical signal. The optical amplifiers 108a, 108b, 108c, 108d may include laser amplifiers, doped fiber amplifiers (DFAs), erbium doped fiber amplifiers (EDFAs), semiconductor optical amplifiers, Raman amplifiers, optical parametric amplifiers, and the like.

In the optical networking system 100, each of multiplexer modules 106, 112, demultiplexer modules 110, 114, and optical amplifiers 108a, 108b, 108c, 108d may form a network node or network element jointly or separately as redistribution points or communication endpoints. For example, a multiplexer module 106 and light sources 102a, 102b may form an add network element (ADD NE) 105 to distribute light signals originated from light sources 102a, 102b into the optical networking system 100. The ADD NE 105 may be located upstream in the optical network system 100. A demultiplexer module 110, multiplexer module 112, light sink 104a, and light source 102c may form an express network element (Express NE) 111 to redistribute the optical signals originated from the light sources 102a, 102b, 102c. A demultiplexer module 114 and light sinks 104b, 104c may form a drop network element (DROP NE) 115 as communication endpoints. The DROP NE 115 may be located downstream in the optical networking system 100. The optical signals demultiplexed by the demultiplexer module 114 may be provided to light sinks 104b, 104c where those signals are converted into client digital transport data (e.g. SONET/SDH/OTN frames).

The network elements (NEs) 105, 111, 115 may include one or more network cards such as light sources 102a, 102b, 102c, light sinks 104a, 104b, 104c, multiplexer modules 106, 112, demultiplexer modules 110, 114. For example, an ADD NE 105 may comprise light sources 102a, 102b and multiplexer module 106. An Express NE 111 may comprise a light sink 104a, light source 102c, demultiplexer module 110, and multiplexer module 112. The DROP NE 115 may comprise light sinks 104b, 104c and demultiplexer module 114. The NEs 105, 111, 115 may be network nodes, hops, or the like.

The NEs 105, 111, 115 with network cards may be connected to each other with an inter-card communication network 123 and an inter-NE communication network 124. The inter-card communication network 123 may involve card control communications between cards within NEs 105, 111, 115 by using link layer protocols such as Ethernet. The inter-NE communication network 124 may involve control data communications between NEs 105, 111, 115 generally through Optical Supervisory Channel (OSC) that is carried on the same fiber where optical signals that encode digital transport data (i.e. L0 data plane) is carried. The inter-card communication network 123 and inter-NE communication network 124 may also be connected to control domains of network elements. Such control domains may include source control domain 116 for light sources 102a, 102b, 102c, multiplexer control domains 118a, 118b for multiplexer modules 106, 112, and demultiplexer control domains 122a, 122b for demultiplexer modules 110, 114. Control domains may generate control domain/plane messages and transmit the control domain/plane messages with control data 120 to different network elements via the inter-card communication network 123 and inter-NE communication network 124. For example, light sources 102a, 102b, 102c or light sinks 104a, 104b, 104c may generate digital fault messages within its source control domain 116 when it detects an error in encoding or decoding digital frames. These digital fault messages may be transmitted to other network elements via the inter-card communication network 123 and inter-NE communication network 124.

Multiplexer/demultiplexer modules 106, 110, 112, 114 may include a Wavelength Selective Switch(WSS), WSS controller, Optical Power Monitoring (OPM) unit, and Optical Supervisory Channel (OSC) controller. Multiplexer modules 106, 112, and demultiplexer modules 110, 114 may also generate Optical Layer Defect Propagation (OLDP) messages using overhead frames mapped to an optical supervisory channel (OSC). For example, when there is a failure caused by fiber cuts in the upstream network, the multiplexer modules 106, 112 may generate a forward defect indication (FDI) message within the multiplex control domain 118a, 118b and transmit the FDI message to the downstream network via the inter-card and inter-NE communication network 124.

An OLDP may be a fault propagation mechanism in the optical layer for Operations Administration Maintenance (OAM) considerations and to facilitate protection or restoration using the overhead frames mapped to an OSC. The OAM may be a standardized terminology in transport networks used to monitor and manage the network. The OSC may refer to an additional wavelength that is usually outside of the amplification band (e.g. at 1510 nm, 1620 nm, 1310 nm or another proprietary wavelength). The OSC may carry information about multi-wavelength optical signals as well as remote conditions at the optical add/drop or OA sites. The OSC may be used for OAM in DWDM networks. The OSC may be the multi-wavelength analogue to SONET's DCC (or supervisory channel).

As described above, control data 120 may include various types of control messages for the purpose of network management across various domains. It may include power control domain messages, protection domain massages, routing domain messages, and the like. The control data 120 may originate from domains such as source control domain 116, multiplexer control domains 118a, 118b, demultiplexer control domains 122a, 122b, and the like. The control data 120 in band control domain may reflect the state of the domain and may be carried across the domains in a synchronized fashion. The control data 120 may be carried from a control domain to another control domain via an in-band or out-of-band communication channel such as OSC. Alternatively, the control data 120 may be carried between domains through a centralized controller that has network topology information on it.

Figure 2:
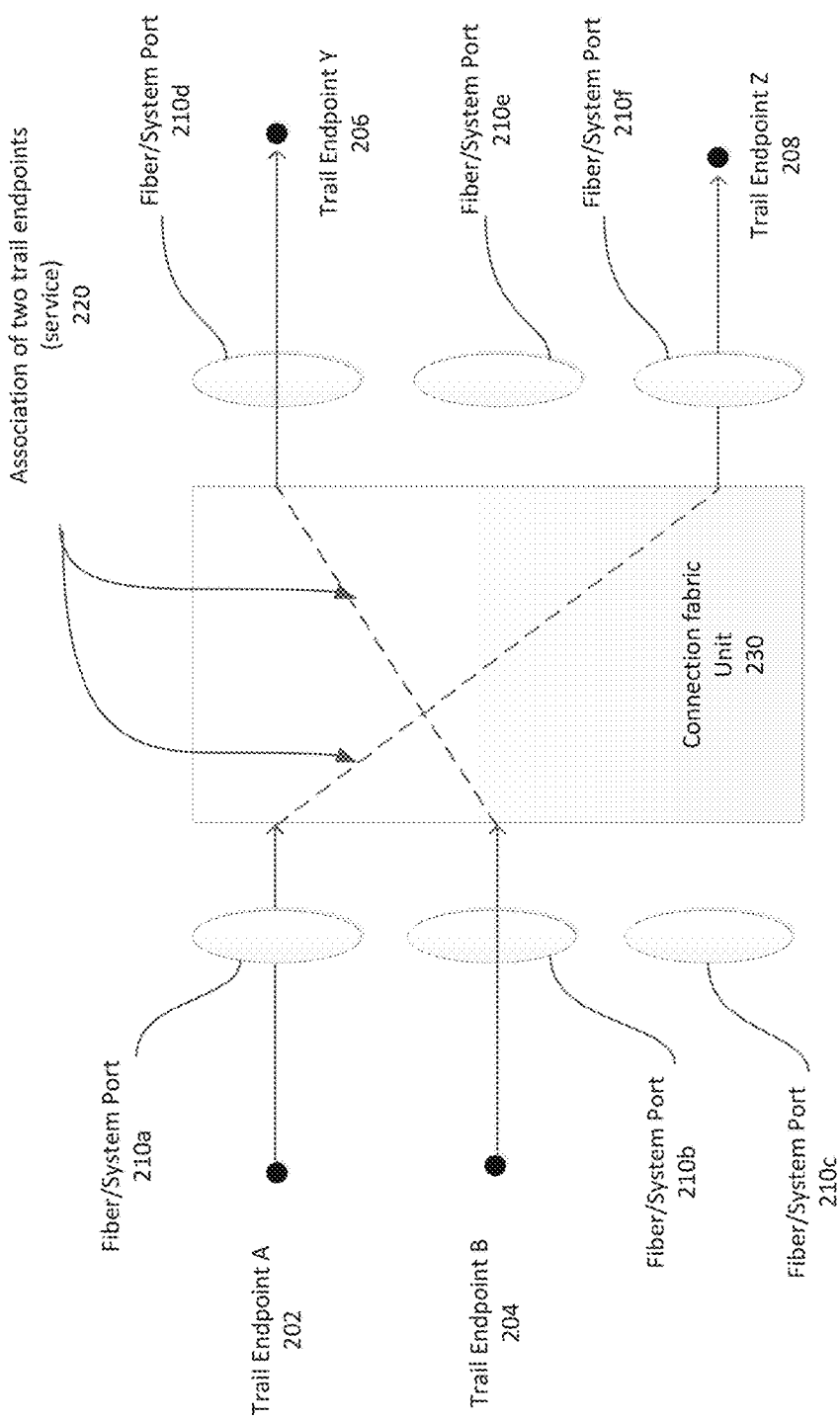
FIG. 2 is a diagram illustrating example physical connections within a connection fabric unit in a transport network.

FIG. 2 is a diagram illustrating example physical connections within a connection fabric unit 230 in a transport network. A transport network may comprise transport network elements connected by optical fiber links. With the transport network elements, the transport network can provide functionality of transport, multiplexing, switching, management, supervision and survivability of optical or digital channels carrying client signals. The transport network elements may involve service provisioning through a network management entity located in northbound interfaces. The network management entity may be a Network Management System (NMS), Generalized Multi-Protocol Label Switching (GMPLS), or similar control plane mechanism handling dynamic service provisioning.

The network management entity may configure a connection fabric unit 230 to create or delete service provisioning. The service provisioning may involve association of two trails as end-points 220 to flow client signals across the connection fabric unit 230. A trail is a transport entity that can simultaneously transfer client payload information and overhead information in the transport network. The service provisioning in the connection fabric unit 230 is physically responsible for the transfer of information, for example, from an input trail endpoint A 202 to an output trail endpoint 208. In case of digital networks like Optical Transport Network (OTN), such a trail transport entity is an Optical Data Unit (ODU). The connection fabric unit 230 involved in the OTN may be an ODU fabric, Virtual Container (VC) fabric, or the like. The VC fabric may operate at a higher rate where OTN frames are inversely mapped to the VC fabric through Generic Mapping Procedure (GMP).

In case of digital networks like SDH, such a trail transport entity is a higher or lower order VC. The connection fabric unit 230 involved in SDH is a VC fabric. In case of optical networks, such a trail transport entity is a super-channel with overhead information. The super-channel may be a part of an optical spectrum that carries digital transport client information modulated to an optical signal. The connection fabric unit 230 involved in the optical network is a Wavelength Selective Switch (WSS), Multicast Switch (MCS), or the like. The trail transport entity may include client entity/signal/data which needs to be transported in the network and specific Operations Administration Maintenance (OAM) overheads. As shown in FIG. 2, the connection fabric unit 230 may include fiber/system ports 210a, 210b, 210c, 210d, 210e, 210f to transmit and receive trail transport entities.

A digital network as used herein means a network that focuses mostly on aspects of mapping multiple digital clients to a larger digital wrapper. Such multiple digital clients may be plesiochronous digital hierarchy (PDH) data, storage data, Asynchronous Transfer Mode (ATM), Ethernet data, or the like. The larger digital wrapper may be SONET frames, SDH frames, OTN frames, or the like. An optical network as used herein means a network that focuses mostly on mapping a larger digital wrapper to some wavelengths in the C/L/Ext-C band of an optical spectrum to be carried over the fiber. The larger digital wrapper may be SONET frames, SDH frames, OTN frames, or the like. In an embodiment, the larger digital wrapper may include direct Ethernet data by-passing SONET/SDH/OTN encapsulations. The optical network also focuses on multiplexing multiple spectra or wavelengths so that they can be carried over the same fiber. The digital network herein may mean a L1 layer. The optical network herein may mean a L0 layer. A L0 layer has the capability to carry L1 data.

A transport entity that includes client information may be carried across the connection fabric unit 230 by service provisioning. Specifically, once a network operator or user initiates service provisioning by setting configuration of the connection fabric unit 230, the transport entity (e.g. a super-channel with overhead information in case of an optical network) may start flowing from a trail endpoint A 202 to the connection fabric unit 230 through the fiber port 210a. Based on the configuration settings in the connection fabric unit 230, the transport entity may be connected to a trail endpoint Z 208 through the fiber port 210f. Similarly, another transport entity may start flowing from a trail endpoint B 204 to the connection fabric unit 230 through the fiber port 210b. Based on the configuration settings in the connection fabric unit 230, the transport entity may be connected to a trail endpoint Y 206 through the fiber port 210d. This flow of transport entity based on association of two trail endpoints 220 may be referred to as a service. In FIG. 2, the trail endpoint A 202 is associated to the trail endpoint Z 208 for the first service. The trail endpoint B 204 is associated to the trail endpoint Y 206 for the second service.

Figure 3:
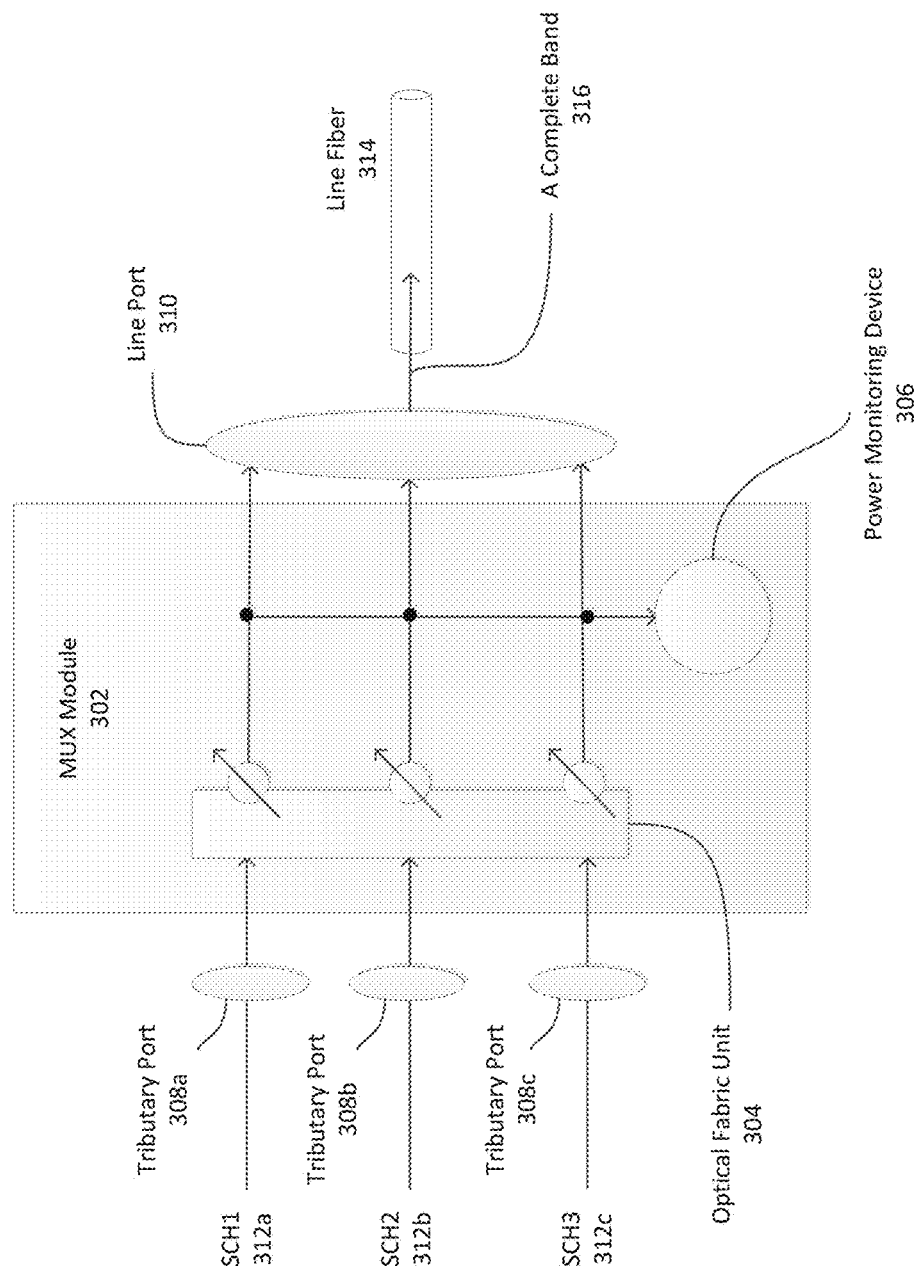
FIG. 3 is a diagram illustrating an example multiplexing module that includes an optical fabric unit and power monitoring device for power control.

FIG. 3 a diagram illustrating an example multiplexer module 302 that includes an optical fabric unit 304 and power monitoring device 306 for power controls in an optical network. The multiplexer module 302 may include tributary ports 308a, 308b, 308c, an optical fabric unit 304, a power monitoring unit 306, and a band port 310. As shown in FIG. 3, the multiplexer module 302 may receive super-channels (SCHs) 312a, 312b, 312c through the tributary ports 308a, 308b, 308c. The super-channels (SCHs) 312a, 312b, 312c may be carried over as transport entities as described above. The optical fabric unit 304 may be used to make associations across the tributary ports 308a, 308b, 308c and the band port 310, thereby establishing services. Each of the tributary ports 308a, 308b, 308c may receive multiple super-channels in addition to the super-channels (SCHs) 312a, 312b, 312c. For example, the tributary port 308a may receive SCH1 312a and other super-channels that are not shown here.

In an embodiment, the optical fabric unit 304 may be a Wavelength Selective Switch (WSS) to control power levels of the SCHs 312a, 312b, 312c. Specifically, the WSS device may provide an option to configure attenuation to control the launch power of the SCHs 312a, 312b, 312c. Thus, in this embodiment, the optical fabric unit 304 and the power control points are the same WSS. In another embodiment, the optical fabric unit 304 may just make associations across the tributary ports 308a, 308b, 308c and the band port 310 to establish services, but does not control power levels of the SCHs 312a, 312b, 312c. The power control of the SCHs 312a, 312b, 312c may be performed separately by other devices such as Variable Optical Attenuator (VOA). In this case, the optical fabric unit 304 and the power control point are not the same device. Thus, as shown by above embodiments, the optical fabric unit 304 may or may not control the power levels of SCHs 312a, 312b, 312c. The optical fabric unit 304 may not be limited to any particular kind of fabric and may cover all possible fabric architectures.

To facilitate the power control, the multiplexing module 302 may include a power monitoring device 306 such as Optical Power Monitor (OPM). The power monitoring device 306 may be a device having a capability to monitor power on a per slice basis. A slice refers to each of the constituent band in an N GHz (N=12.5, 6.25, 3.125) spaced frequency band of an optical spectrum. The slice may be a resolution at which the power levels can be measured by the OPM device. The power level being measured by the OPM device may represent the total optical power carried by the band represented by that slice. A pass-band of SCHs 312a, 312b, 312c may be composed of a set of contiguous slices.

SCHs 312a, 312b, 312c may come through tributary ports 308a, 308b, 308c to the optical fabric unit 304. The optical fabric unit 304 may route or switch the SCHs 312a, 312b, 312c to the line port 310. In the line port 310, these SCHs 312a, 312b, 312c may be combined together and egressed through a line fiber 314. It is in the line port 310 that the complete band is formed out of all these individual SCHs 312a, 312b, 312c and other individual SCHs that are not shown here. The fiber connected on the line port 310 is called the line fiber 314. The complete band 316 may include multiple SCHs 312a, 312b, 312c inside the band interface. Thus, the line fiber 314 carries the multiple SCHs 312a, 312b, 312c which form the complete band 316.

For the purpose of fault isolation and channel protection and restoration, an optical networking system may include defect signaling indications that are carried in in-band or out-band overhead of optical signals. For example, a transport network may include Operations Administration Maintenance (OAM) to facilitate fault isolation by monitoring and managing the network. In case of a digital network such as OTN, various fault triggers carried in in-band overhead are Open Connection Indication (OCI), Alarm Indication Signal (AIS), and Lock (LCK). OTN equipment in the OTN may carry those indications in in-band OTN frame bytes. When the connection in the digital connection fabric unit is absent, the digital connection fabric unit may source OCI. In case of upstream failures, NEs in the upstream may transmit AIS to the downstream to indicate that some problem has occurred in the upstream. LCK may be sourced from a network operator or user as part of locking the ODU trail endpoints in a digital connection fabric unit or the similar container card. The upstream failure situations may include a patch cable cut between network cards local to NEs, a span fiber cut between two NEs, a power failure in NE, and the like.

In case of a digital network, OCI signaling may be cleared once the connection setup is done in digital connection fabric unit. It is because, after a network operator or user initiates service provisioning in the digital connection fabric unit, in the digital network, it would ensure flow of the ODU trail across the digital connection fabric unit and the connection setup is immediately finished without further process. After the connection setup is done in the digital connection fabric unit, any upstream failure condition does not affect deletion of the connection in the digital connection fabric. In such a situation, AIS may be sourced immediately. Once the upstream failure is rectified, the AIS may be immediately cleared. When a network operator or user issues a lock command, LCK is signaled immediately, but the connection in the digital connection fabric unit is left as it is. When the network operator or user releases the lock command, the LCK is cleared. As described herein, in the digital network, once the connection in the digital connection fabric unit is setup after the service provisioning by a network operator, the connection may not be teared-down until the service is un-provisioned. In the digital network, the digital connection fabric may be an ODU fabric.

In case of an optical network as shown in FIG. 3, various fault triggers carried in Optical Supervisory Channel (OSC) are Open Connection Indication (OCI), Forward Defect Indication (FDI) (similar to AIS), and Lock (LCK). Optical networks which involve a WSS device as an optical fabric unit 304 may have different behavior with respect to the connection life-time in the optical fabric unit 304.

When a network operator or user initiates service provisioning in an optical network, it would associate super-channel trails across the optical fabric unit 304, but, unlike the digital network, the connection setup in the optical fabric unit 304 may not be immediately done. Once the super-channel is provisioned (i.e. provided) in the optical fabric unit 304, an auto-discovery mechanism may be initiated in the multiplexing module 302 to sense whether the wavelength tuned from the light origination point is correct. Only when the auto-discovery completes, the connection in the optical fabric unit 304 may be setup. Furthermore, in the optical network, the connection setup in the optical fabric unit 304 may not ensure flow of the super-channel trails across the optical fabric unit 304 because the power control further needs to be done to launch the super-channels 312a, 312b, 312c on the outgoing link with an optimal power level. This may be achieved through attenuation controls in the WSS device or the VOA depending on the type of optical fabric unit 304 used. In the optical fabric unit 304 of the optical network, the super-channels 312a, 312b, 312c are gradually brought up to meet a target power level, which is optimum for the line fiber 314 to which the super-channels 312a, 312b, 312c are launched. This can involve a closed loop control where the power levels are measured for the super-channels 312a, 312b, 312c through a power monitoring device 306 after the attenuation level is set up. The power monitoring device 306 may be an OPM device or a similar spectrum power measuring device. Thus, the control cycle of the closed control loop may involve repeating the attenuation setting followed by power measurement until the desired target power is achieved for the super-channels 312a, 312b, 312c. In an embodiment, more sophisticated schemes may involve spectral shaping through the power control at a finer wavelength or slice level so that the complete optical profile of the super-channel is balanced and flat. This whole process is called hereinafter as a ramp process. These mechanisms of gradual power control and spectral shaping may be required to avoid abrupt behavior in the downstream NEs, for example, to avoid amplifier saturation or the like. Thus, as described above, the super-channel trails may not be deemed to be up across the optical fabric unit 304 until the ramp process is complete. Therefore, in the optical network, fault signaling such as OCI may need a different handling than the digital network. For example, the fault signaling may not be cleared solely based on the service provisioning status because it should additionally account for the ramp process status.

Another aspect of optical networks is that when there is a failure in the upstream link, to avoid leakage of noise that causes abnormal behavior in the downstream link, the entire connection in the optical fabric unit 304 may be teared-down. This may be important from the operational point of view. Specifically, when upstream failures have been rectified and the power levels of super-channels 312a, 312b, 312c has changed due to the upstream failures (e.g. changes in span loss, etc.), if the connection in the optical fabric unit 304 is kept intact, this may lead to leakage of a large abrupt power to the downstream NEs. It may also be dangerous because a super-channel with abnormal power levels can bring down traffic on different super-channels running closely by the spectrum. Thus, to avoid such abnormal effects, the connection in the optical fabric unit 304 may be teared-down on upstream failure conditions to be on the safer side. This is unlike the digital network where the connection in the digital connection fabric unit is still kept intact on upstream failure conditions.

In the optical network, after the upstream failure is rectified, the connection in the optical fabric unit 304 may be brought up again as if the service provisioning is initiated for the first time. For example, pass-bands of the super-channels 312a, 312b, 312c are created back in the optical fabric unit 304. A ramp process associated with the service provisioning is started again to control the power levels of the super-channels 312a, 312b, 312c and to meet the target optimal power level. Thus, unlike the digital network where the upstream failure rectification means the downstream defect indication (e.g. FDI) to be cleared immediately, in the optical network, the upstream failure rectification may not indicate that such a downstream defect indication is to be cleared immediately. It is because the super-channels 312a, 312b, 312c may not be deemed up immediately after the upstream failure is rectified. The super-channels 312a, 312b, 312c may only be deemed up once the ramp process has been completed. In the optical network, the FDI clear indication may not be signaled to the downstream network until the ramp process is completed. Thus, as compared to the digital network, the optical network may need different handling for FDI.

In the optical network, if a network operator intends to bring down the complete downstream traffic on the super-channels 312a, 312b, 312c, the network operator may issue a lock command on endpoints of the super-channels 312a, 312b, 312c in the optical fabric unit 304. Upon issuance of the lock command, the connection in the optical fabric unit 304 becomes completely deleted. The complete deletion of the connection may mean that light flow from a trail endpoint A 202 to a trail endpoint Z 208 is completely stopped. This is unlike the digital network where the downstream traffic is brought down by inserting a particular lock byte pattern in the digital frames rather than deleting the connection in the digital connection fabric unit. If the network operator intends to clear the lock command in the digital network, the network operator may issue a lock clear command which may result in removing the lock pattern in the digital frames and the traffic is restored immediately. However, in case of the optical networks, if the network operator intends to clear the lock command, the connection in optical fabric unit 304 may need to be setup again and the ramp process associated with the connection setup may need to be completed again to bring the traffic up. Thus, as compared to the digital network, optical networks may need different handling for lock commands.

Apart from all these, if upstream failure conditions are not sufficient to trigger deletion of the connection in the optical fabric unit 304, but still sufficient to cause traffic down for a super-channel, an FDI may need to be sourced to the downstream as the super-channel is down. For example, when multiple super-channels including SCH1 312a land on the tributary port 308a, if one super-channel goes down while the rest of the super-channels are up, an OLOS condition may not occur on the tributary port 308a because of which the connection in the optical fabric unit 304 for the dead super-channel cannot be deleted. In such cases, a power monitoring device 306 may be used to source FDI to the downstream network. Specifically, if the power monitoring device 306 concludes that the power level of the super-channels 312a, 312b, 312c is very low, then FDI may be sourced irrespective of the deletion of the super-channels 312a, 312b, 312c in the optical fabric unit 304. Thus, FDI may still be signaled while the connection in the optical fabric unit 304 is intact. Similarly, the power level of the super-channels 312a, 312b, 312c may need to be checked continuously after the ramp process is completed. For example, after upstream failure is rectified or lock clear command is released, the power monitoring device 306 may keep monitoring the power level of the super-channels 312*a*, 312*b*, 312*c*. Even though the connection in the optical fabric unit 304 is present and the super-channels 312*a*, 312*b*, 312*c* have been ramped up, if the power level of the super-channels 312*a*, 312*b*, 312*c* goes below a certain threshold, FDI may be signaled to the downstream network. The power monitoring device 306 may be an OPM or similar power measuring device to measure the power levels of the super-channels 312*a*, 312*b*, 312*c*.

Optical networks may not include signaling defect indications based on a ramp process or a mechanism where an upstream failure triggers deleting a connection in the optical fabric unit 304 in order to simplify an optical network system design and associated complexities. Specifically, once service provisioning is done, such optical network system may regard the connection in the optical fabric unit 304 intact until the service is un-provisioned by a network operator. Moreover, in such optical networks, power levels are kept optimal from the beginning to avoid complexities related to the ramp process. This is to keep the defect signaling behavior simple and similar to that in the digital network. However, in such cases, several network problems, for example, leakage of noise and abrupt behavior in the downstream NEs, may occur. Such network problems may impact on traffic that is already up and running super-channels due to potential leakage of high power. Thus, with respect to defect signaling behaviors in the optical network, it is desired that a ramp process for the super-channels is kept gradual and connections in the optical fabric unit 304 are synced to upstream failure conditions.

Figure 4:
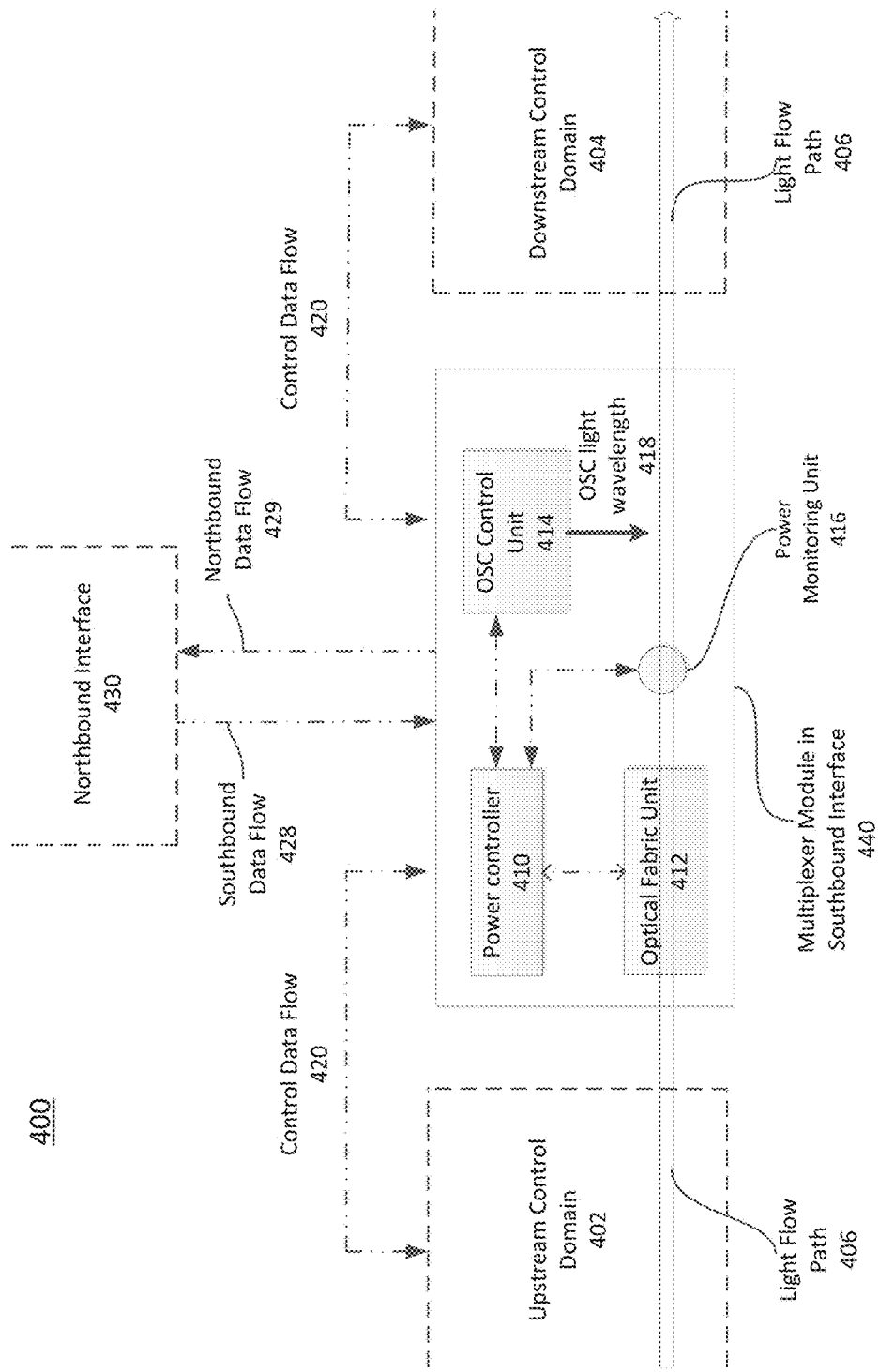
FIG. 4 is a system diagram of an example optical networking system with control domain demarcation in which one or more disclosed embodiments may be implemented.

FIG. 4 is a system diagram of an optical networking system 400 with control domain demarcation in which one or more disclosed embodiments may be implemented. As shown in FIG. 4, the optical networking system 400 may include an upstream control domain 402, a downstream control domain 404, a northbound interface 430, and a southbound interface 440. The upstream control domain 402 may include ADD NE 105, OAs 108*a*, 108*b*, and the like. As described above, the ADD NE 105 may comprise a multiplexer module 106 and light sources 102*a*, 102*b* to distribute light signals. The light signals may flow into the optical networking system 400 via a light flow path 406. The light flow path 406 may be through each of the NEs in the upstream control domain 402 and downstream control domain 404. The light signals in the light flow path 406 may comprise data plane that carry client data from the upstream to the downstream.

Each NE in the upstream control domain 402 may generate control messages and send the control messages to the downstream NEs via a control data flow 420. For example, if a patch-cable cut occurred in the upstream control domain 402, a multiplexing module 106 may detect the patch-cable failure and generate a control message such as Forward Defect Indication (FDI). The FDI may be carried in the control data flow 420 using overhead frames mapped to an OSC. The control data flow 420 may be a part of inter-card communication network 123 and/or inter-NE communication network 124 that connects each of the NEs in the optical networking system 400. The control messages in the control data flow 420 may be any type of OLDP messages using overhead frames mapped to an OSC. The control messages may include an Open Connection Indication (OCI), lock (LCK), FDI, and the like.

The downstream control domain 404 may include DROP NE 115, OAs 108*c*, 108*d*, and the like. As described above, the DROP NE 115 may comprise a demultiplexer module 114 and light sinks 104*b*, 104*c* to receive light signals. The light signals that flowed through the light flow path 406 may terminate at the light sinks 104*b*, 104*c*. The light signals received via the light flow path 406 may be demodulated into digital transport data for digital transport networks such as SDH, SONET, OTN or the like. Each NE in the downstream control domain 404 may also generate control messages and receive the control messages from the upstream NEs via control data flow 420. For example, if the connection in the optical fabric unit 412 is absent, a power controller 410 may detect the absent state and generate a control message such as Open Connection Indication (OCI). The OCI may be transmitted to an OSC Control Unit 414 where the OCI is carried in the control data flow 420 using overhead frames mapped to an OSC. The NEs in the downstream control domain 404 may receive the OCI via the control data flow 420. The control messages received at the downstream NEs may be any type of OLDP messages using overhead frames mapped to an OSC. The control messages may include an OCI, LCK, FDI, and the like.

A northbound interface 430 is an interface that allows a particular NE to communicate with a higher-level component. Generally, networking equipment that interfaces with a network operator may be the northbound interface 430. For example, the northbound interface 430 includes a network management entity such as NMS or GMPLS. Conversely, a southbound interface allows a particular NE to communicate with a lower-level component. Generally, networking equipment that interfaces with a network management entity in the northbound interface 430 may be the southbound interface. For example, a multiplexer module 440 that interfaces with the northbound interface 430 may be included in the southbound interface. Northbound data flow 429 can be thought of as going upward, while southbound data flow can be thought of as going downward. For example, the southbound data flow includes a user initiated lock command or configuration for service provisioning. The north bound data flow 429 may include alarms and performance monitoring data.

Depending on the network topology, the multiplexer module 440 in the southbound interface may be located in ADD NE 105 or Express NE 111 to provide various defect indications. The multiplexer module 440 may include a power controller 410, an optical fabric unit 412, a power monitoring unit 416, and an OSC control unit 414. The power controller 410 may comprise a processor and memory. The power controller 410 may be configured to provide one or more signaling indications of a super-channel that are carried on the light flow path 406, based on input state variables. For example, the power controller 410 may receive, from a network management entity in the northbound interface 430, a service provisioning state of the super-channel. A network operator or user may initiate service provisioning of the super-channel by configuring association of multiple trail-endpoints 202, 204, 206, 208 in a connection fabric unit 230. Specifically, the network operator may determine that the trail endpoint A 202 is to be associated with the trail endpoint Z 208, while the trail endpoint B 204 is to be associated with the trail endpoint Y 206. The network operator may apply such a configuration by a network management entity in the northbound interface 430. After the configuration has been applied, a super-channel that includes client data and overhead information may start flowing between two trail endpoints, the trail endpoint A 202 and the trail endpoint Z 208, or the trail endpoint B 204 and the trail endpoint Y 206. This may be called as the association of two trail endpoints in the optical fabric unit 412. The service provisioning state may indicate whether a network operator or user created or deleted at least one association of multiple trail end-points for user data flow across the optical fabric unit 212. If the network operator initiates the service provisioning (i.e. the association of multiple trail end-points is created), the power controller 410 may determine the service provisioning state as service provisioning created status. If the network operator ceases the service provisioning (i.e. the association of multiple trail end-points is deleted), the power controller may determine the service provisioning state as service provisioning deleted status. Here, the connection fabric unit 230 in FIG. 2 may correspond to an optical fabric unit 412 in FIG. 4. In an embodiment, the service provisioning state may be called as an Optical Cross Connect (OXCONN) state.

The power controller 410 may also receive, from a network management entity, a lock state. Typically, the network operator or user may issue a lock command at the time of deployment of the network to perform a network test. For example, a network operator may issue a lock command at one end of the network to bring down the data path on the network. After issuing the lock command, the network operator may wait and check whether channel protection or restoration mechanism deployed in the downstream network works or not. The lock state received from the network management entity may indicate whether the network management entity issued a lock command or an unlock command on a management object representing the super-channel. If the received lock state indicates that the network management entity issued a lock command, the power controller 410 may determine the lock state of the super-channel as locked status. If the received lock state indicates that the network management entity issued an unlock command, the power controller 410 may determine the lock state of the super-channel as unlocked status. In an embodiment, the lock state may be called as a Conceptual Termination Point (CTP) state. The CTP may be a user visible object on which a network operator or user in the network management entity may perform lock or unlock operations on the super-channel.

The power controller 410 may receive, from an optical fabric unit 412, a fabric state of the super-channel. The optical fabric unit 412 may route or switch optical signals received through the light flow path 406 on a per-wavelength basis. In order to route or switch the optical signals, the optical fabric unit 412 may include a switching array that operates on light that has been dispersed in wavelength. The fabric state may indicate whether or not a pass-band of the super-channel is provisioned. A passband is the range of frequencies or wavelengths that can pass through the switching array. If the pass-band of the super-channel is provisioned in the optical fabric unit 412, the power controller 410 may determine the fabric state as fabric unblocked status. Based on the fabric state, the power controller 410 may recognize whether or not connection in the optical fabric unit 412 exists. For example, if the pass-band of the super-channel is not provisioned in the optical fabric unit 412, the power controller 410 may determine the fabric state as fabric blocked status. The optical fabric unit 412 may be a Wavelength Selective Switch (WSS) device, Multicast Switch (MCS) device, Variable Optical Attenuator (VOA), or the like. In case of VOA, super-channels may not be filtered out of the complete spectrum such as C-band/L-band/Ext-C band. Thus, the optical fabric unit 412, when implemented with a VOA, may operate on light incident only on a part of the complete spectrum which is represented by the super-channel.

The power controller 410 may further receive, from a power monitoring unit 416, a power level of the super-channel at a line fiber. The power monitoring unit 416 may be any light power measuring device that measures the power in an optical signal. For example, it may be an Optical Power Monitor (OPM), radiometers, photometers, laser power meters (can be photodiode sensors or thermopile laser sensors), light meters, lux meters, or the like. Based on the power level and an attenuation level of the super-channel, the power controller 410 may determine a ramp state in the optical fabric unit 412. The ramp state may indicate whether or not the power level of the super-channel reached to a predetermined target launch power level. For example, if the pass-band of the super-channel is provisioned in the optical fabric unit 412 (i.e. the fabric state is the fabric unblocked) and the power level of the super-channel is reached to the target launch power, the power controller 410 may determine the ramp state as ramp complete status. If the pass-band of the super-channel is provisioned in the optical fabric unit 412 (i.e. the fabric state is the fabric unblocked) and the power level of the super-channel is not reached to the target launch power, the power controller 410 may determine the ramp state as ramp in-progress status. The power level of the super-channel may reach to the predetermined target launch power level from low to high or high to low. The predetermined target launch power level may be determined based on parameters such as a spectrum width of the super-channel, amplifier launch power capability of the WDM equipment, and the like.

A ramp process as used herein means a power control process in the multiplexer module 440 by adjusting an attenuation level on the optical fabric unit 412 to meet a transmit power on the line fiber to a predetermined target launch power of the super-channel in the multiplexer module 440. Specifically, the optical fabric unit 412 may be controlled by an automatic control loop mechanism to account for losses, equipment aging and change of power at optical signals source. The generic multiplexing or de-multiplexing ramp process may involve associating a tributary input port of the optical fabric unit 412 with a band port or vice-versa so that light can flow from the tributary port to the band port in the multiplexing direction or the band port to the tributary port in the de-multiplexing direction, respectively. The ramp process may also involve setting the attenuation in the optical fabric unit 412 step-wise, in a phased manner, to gradually launch the optimal power value out of the egress port and shaping up the power spectrum of the super-channel by fine-tuning the spectral slices of the super-channel in the optical fabric unit 412. Until such a process is complete, an optical data path may not be deemed to be up and the traffic path for the optical data may not be healthy enough to be considered for optical channel protection or restoration. The optical fabric unit 412 may be a WSS device that is used in optical communications networks to route or switch optical signals between optical fibers on a per-slice basis. Generally, the optical fabric unit 412 may control power levels by specifying an attenuation level on a pass-band. The optical fabric unit 412 may be programmable for source and destination fiber ports and associated attenuation may be specified for a pass-band.

Attenuation as used herein means the reduction in intensity of the light. The attenuation level of the super-channel may be set during the ramp process with respect to the power level measured at a line fiber. For example, the attenuation value in the optical fabric unit 412 may be adjusted to keep the super-channel launch power at a constant level. The target launch power of the super-channel may be determined based on spectrum width of the super-channel and a maximum amplifier launch power on a line fiber. If the input power at the tributary port of the optical fabric unit 412 decreases, the power controller 410 brings down the attenuation level in the optical fabric unit 412 to maintain the same target launch power. Similarly, when the input power increases, the power controller 410 increase the attenuation level in the optical fabric unit 412 to keep the target launch power at a constant level. This may be a continuous process which happens as part of the ramp process.

If the power controller 410 has stopped applying the attenuation in the optical fabric unit 412 because the target launch power is met, the power controller 410 may determine that the ramp state is complete. However, if the power controller 410 is still applying the attenuation in the optical fabric unit 412 because there is a difference between the launch power and actual measured power (as measured and computed from the power monitoring unit 416), then the power controller 410 may determine that the ramp state is in-progress. The ramp state may change from in-progress to complete or vice versa due to fluctuations in the input power levels. Moreover, the ramp state may also change due to device aging factors in a WDM system which can result in changes in loss or gain values of the WDM system. Since the input power level in the WDM system may fluctuate at any time due to various reasons, the power controller 410 may frequently evaluate and adjust the attenuation level, for example, every 1 second.

In an embodiment, after an upstream failure recovered, the power controller 410 may need to make a connection in the optical fabric unit 412 again and continue the adjustment of attenuation in the optical fabric unit 412 to meet the target launch power. It is because, after an upstream failure occurred, the connection in the optical fabric unit 412 became tore down and this resulted in no light launched on to the fiber. Accordingly, after the upstream failure is recovered, the ramp state changes from a ramp in-progress status to a ramp complete status when the power level of the super-channel is reached to the target launch power.

The power controller 410 may determine an alarm state based on the power level of the super-channel. The power level of the super-channel may be measured by a power monitoring unit 416 that can monitor power on a per slice basis. The alarm state may represent whether or not the power of the super-channel is very low serving as a condition to signal FDI downstream. Generally, a threshold value determining that the power level is too low is the reliability threshold value of the power monitoring unit 416. The power monitoring unit 416, for example, an OPM, may not measure powers less than the reliability threshold value. If the measured power level is less than the reliability threshold value of the power monitoring unit 416, the power controller 410 may determine that the power level of the super-channel is too low. However, the alarm state may have meaning only when the ramp process is completed (i.e. the ramp state is the ramp completed status). The measured power level during a ramp process (i.e. the ramp state is the ramp in-progress status) may be ignored as it is possible that the low power measured by the power monitoring unit 416 is because the ramp is not completed. In addition, it is possible that high attenuation levels in the optical fabric unit 412 lead to the low input power at the power monitoring unit 416. Thus, if the ramp state is the ramp complete status and the measured power level of the super-channel is lower than a reliability threshold value, then the power controller 410 may determine the alarm state as alarm condition status or alarm zone status. On the contrary, if the ramp state is the ramp complete status and the measure power level of the super-channel is higher than the reliability threshold value, the power controller 410 may determine the alarm state as no alarm condition status.

After receiving the service provisioning state, the lock state, the fabric state, the ramp state, and the alarm state, the power controller 410 may determine at least one signaling indication of the super channel based on the received states and transmit the signaling indication to an optical supervisory channel (OSC) control unit 414. The signaling indication of the super channel includes an open connection indication (OCI), a lock indication (LCK), a forward defect indication (FDI), a clear indication and the like. For example, if a ramp state is ramp in-progress status and a service provisioning state is service provisioning created status, the power controller 410 may continue transmitting an OCI to the OSC control unit 414 to indicate that, even though the service provisioning is done, the connection in the optical fabric unit 412 is still in-progress (e.g. the connection is not fully up) from the perspective of data plane. If the ramp state is the ramp complete status and the service provisioning state is the service provisioning created status, the power controller 410 may transmit a clear indication to the OSC control unit 414 to clear the OCI in the downstream network.

In an embodiment, if a ramp state is a ramp complete status and an alarm state is a no alarm condition status, the power controller 410 may transmit a clear indication to the OSC control unit 414 to clear previous signaling indications. If the ramp state is the ramp complete status and the alarm state is the alarm condition status, the power controller 410 may transmit an FDI indication to the OSC control unit 414 to indicate that there is an upstream failure condition. If the ramp state is the ramp in-progress status, the power controller 410 may continue transmitting an FDI indication to the OSC control unit 414 to indicate that, even if the upstream failure is rectified, the connection bring-up in the optical fabric unit 412 is still in-progress (e.g. the connection is not fully up) from the perspective of data plane.

In another embodiment, if a lock state is a locked status and a fabric state is a fabric unblocked status, the power controller 410 may transmit an LCK indication to the OSC control unit 414 to indicate that the lock command is issued from a network management entity even though the connection on the optical fabric unit 412 is still to be teared down. If the lock state is the unlocked status and the fabric state is the fabric blocked status, the power controller 410 may transmit an LCK or FDI indication to the OSC control unit 414 to indicate that, even though the lock is cleared, the data plane is still not fully up. The power controller 410 may wait in this state until the fabric state becomes the fabric unblocked status.

In another embodiment, if a lock state is an unlocked status and a ramp state is a ramp in-progress status, the power controller 410 may continue transmitting an LCK or FDI indication to the OSC control unit 414 to indicate that, even though the lock is cleared, the data plane is still not fully up. The power controller 410 may wait in this state until the ramp state becomes the ramp complete status. If the lock state is the unlocked status and the ramp state is the ramp complete status, the power controller 410 may transmit a clear indication to the OSC control unit 414 to clear previous signaling indications.

Upon receiving the signaling indications described above, the OSC control unit 414 may add the signaling indications into an OSC light wavelength 418. The OSC is an additional wavelength, which carries overhead information for network management and control purposes. Thus, the signaling indication in the OSC light wavelength may be transmitted as a trail overhead of the super-channel to the downstream network. The trail overhead in the OSC light wavelength may be transmitted to the downstream control domain 404 via the light flow path 406.

FIG. 5 is a diagram illustrating a signaling engine 502 with state variable inputs to provide at least one signaling indication of a super-channel. A NE such as a multiplexer module 440 in FIG. 4 may involve a phased ramp process and dynamic connection creation and deletion in response to upstream failure conditions or lock command. To implement the signaling of defects in such a NE, a power controller 410 may implement a state machine-based implementation (i.e. signaling engine 502) tied to the service provisioning state 506, the fabric state 504 in an optical fabric unit 412, the ramp state 510 of the super-channel, the lock state 508, and the alarm state 512 based on the feedback of power monitoring unit 416. A power control system that includes the power controller 410 may be an Optical Add Drop Multiplexer (OADM), Reconfigurable OADM (ROADM), Fixed OADM(FOADM), or the like. In case of OADM or ROADM, the optical fabric unit 412 may be a WSS device and the power monitoring unit 416 may be an OPM. In case of FOADM, the optical fabric unit 412 may be a Variable Optical Attenuator (VOA) and the power monitoring unit 416 may be a Photo Diode (PD). In such a case, the ramp process involves controlling the VOA to adjust power levels and the PD measures the power levels for a particular spectrum associated with a super-channel. Although the power control systems are described above in particular WDM systems, each element may be used in any type of optical fabric with a separate power control device and a spectrum power measuring device.

The signaling engine 502 may be associated with a super-channel (based on the spectrum which it represents. The signaling engine 502 may be implemented as a state machine which has five state variables as an input. Referring to FIG. 5, the signaling engine 502 is illustrated with the five state variable inputs. As described above, the service provisioning state 506 may be configured by a network operator for the spectrum that is represented by the super-channel. The service provisioning state 506 may include following values in the signaling engine 502.

VALUES:=SERVICE_PROVISIONING_UNKNOWN, SERVICE_PROVISIONING_CREATED, SERVICE_PROVISIONING_DELETED

The SERVICE_PROVISIONING_UNKNOWN may indicate the default state with which the signaling engine 502 is initialized for the service provisioning state 506 after the system reboots. The SERVICE_PROVISIONING_CREATED may indicate that a network operator created at least one association of multiple trail end-points for user data flow across the optical fabric unit 412. The SERVICE_PROVISIONING_DELETED may indicate that the network operator deleted the association of multiple trail end-points for user data flow across the optical fabric unit 412.

The lock state 508 may be configured by a network operator for lock or unlock operation on management objects representing the super-channels. The management objects representing the super-channels may be a user visible CTP object on which a network operator or user in the network management entity may perform lock or unlock operations on the super-channel. The lock state 508 may include following values in the signaling engine 502.

VALUES:=LCK_UNKNOWN, LCK_LOCKED, LCK_UNLOCKED

The LCK_UNKNOWN may indicate the default state with which the signaling engine 502 is initialized for the lock state 508 after the system reboots. The LCK_LOCKED may indicate that the network operator issued a lock command. The LCK_UNLOCKED may indicate that the network operator issued an unlock command.

As described above, the fabric state 504 may represent whether the connection in the optical fabric unit 412 exists or not based on the pass-band provisioning in the optical fabric unit 412. The fabric state 504 may include following values in the signaling engine 502.

VALUES:=FABRIC_UNKNOWN, FABRIC_BLOCKED, FABRIC_UNBLOCKED

The FABRIC_UNKNOWN may indicate the default state with which the signaling engine 502 is initialized for the fabric state 504 after the system reboots. The FABRIC_BLOCKED may indicate that the pass-band of the super-channel is not provisioned in the optical fabric unit 412. The FABRIC_UNBLOCKED may mean that the pass-band of the super-channel is provisioned in the optical fabric unit 412.

The ramp state 510 may represent whether the ramp process is complete or in-progress. This input variable should be ignored when the fabric state 504 is not FABRIC_UNBLOCKED. It is because, if there is no connection in the optical fabric unit 412 (i.e. FABRIC_BLOCKED) or the connection is unknown (i.e. FABRIC_UNKNOWN), the ramp state 510 does not have any meaning. The ramp state 510 may include following values in the signaling engine 502.

VALUES:=RAMP_UNKNOWN, RAMP_IN-PROGRESS, RAMP_COMPLETE

The RAMP_UNKNOWN may indicate the default state with which the signaling engine 502 is initialized for the ramp state 510 after the system reboots. The RAMP_IN-PROGRESS may indicate that the power level of the super-channel is not reached to the target launch power at the optical fabric unit 412. The RAMP_COMPLETE may indicate that the power level of the super-channel is reached to the target launch power at the optical fabric unit 412.

The alarm state 512 may represent whether the power level of the super-channel is very low serving as a condition to signal FDI downstream. This variable has meaning only when the ramp state 510 is RAMP_COMPLETE because it is possible that the low power measured by the power monitoring unit 416 is because the ramp process is not complete. Thus, when the ramp state 510 is RAMP_IN-PROGRESS, the alarm state 512 may be ignored. The alarm state 512 may include following values in the signaling engine 502.

VALUES:=ALARM_UNKNOWN, ALARM_CONDITION, NO_ALARM_CONDITION

The ALARM_UNKNOWN may indicate the default state with which the signaling engine 502 is initialized for the alarm state 512 after the system reboots. The ALARM_CONDITION may indicate that the measured power level of the super-channel is lower than a reliability threshold value in the power monitoring unit 416. The NO_ALARM_CONDITION may indicate that the measure power level of the super-channel is higher than the reliability threshold value in the power monitoring unit 416.

It should be noted that with each of the five state variables 504, 506, 508, 510, 512, there is an unknown value possible to handle the reboot cases where the singling engine 502 is kept in UNKNOWN state due to lack of knowledge of the values of the different state variables. After the system reboot, the state of the signaling engine 502 may be kept in UNKNOWN state until all the state variables are in known state to avoid any transient state transition or momentary wrong signaling. When all the state variables are in known state, the signaling engine 502 may deduce the correct signaling engine state in which it was before reboot based on STORED_STATE as read from a persistence device such as Field Programmable Gate Array (FPGA) or a disk. The persistent device may store previous states before the system reboots and help the signaling engine 502 make a decision to move to a known state. Whenever a state transition occurs in the signaling engine 502, the persistent device stores the last state in the STORED_STATE variable in accordance with Table 1.

ST_RAMP_INPROGRESS state. When the ramp process is completed and there are no alarm conditions present, the signaling engine may transition to a NORM_RAMP_COMPLETE state.

However, once the ramp process is completed and there is an alarm condition present that is indicated by the power monitoring unit 416, the signaling engine 502 may move to a NORM_RAMPED_ALARM_CONDITION state. The signaling engine 502 may send FDI downstream in this state. Due to upstream failure conditions or issuance of the lock command by a network operator, when the connection in the optical fabric unit 412 is deleted, the signaling engine may transition to a DELETED state. The signaling engine 502 may move to a NORM_RAMP_INPROGRESS state again when upstream failure is rectified or the power of super-channels that are already ramped up is adjusted again.

TABLE 1

STORED_STATE based on SIGNALING_INDICATION

| SIGNALING_ENGINE_STATE | SIGNALING_INDICATION | STORED_STATE |
| --- | --- | --- |
| START | OCI | OCI_INDICATION |
| FIRST_RAMP_INPROGRESS | OCI | OCI_INDICATION |
| DELETED | If lock state == LCK_LOCKED, then LCK. Otherwise FDI. | CLEAN_INDICATION |
| NORM_RAMP_COMPLETE | CLEAR | CLEAN_INDICATION |
| NORM_RAMP_INPROGRESS | Last signaling alarm | CLEAN_INDICATION |
| LCK_RELEASE_RAMP_INPROGRESS | LCK | STICKY_LCK_INDICATION |
| NORM_RAMPED_ALARM_CONDITION | FDI | CLEAN_INDICATION |
| LCK_ISSUE_WAIT_FOR_DELETE | LCK | CLEAN_INDICATION |
| LCK_RELEASE_WAIT_FOR_RAMP | LCK | STICKY_LCK_INDICATION |

For example, when the signaling engine 502 is in FIRST_RAMP_INPROGRESS state, the signaling indication that will be carried in the OSC for the super-channel is OCI. The value stored in the persistent device is OCI_INDICATION. After the system reboots, if the signaling engine 502 reads the OCI_INDICATION stored in the persistent device, the signaling engine 502 may infer that the ramp state 510 in optical fabric unit 412 was still in progress and was not completed. Thus, the signaling engine 502 may transition to the FIRST_RAMP_INPROGRESS and not to NORM_RAMP_INPROGRESS, and LCK_RELEASE_RAMP_INPROGRESS based on the OCI_INDICATION. Thus, transitioning to other states when the ramp state 510 is in-progress status may be ruled out. Thus, based on the value of other five states 504, 506, 508, 510, 512, the signaling engine 502 may further eliminate and transition to the desired in-progress state.

The signaling engine can be in one of the following states (as SIGNALING_ENGINE_STATE variable). An UNKNOWN state may be the default state with which the signaling engine 502 is initialized to when some or all of the state variables is unknown after the system reboots. Until all the state variables are in some known state, the transitions to other states may be avoided. Once all the state variables are in the known state, based on the STORED_STATE which was read from the persistence device, the signaling engine 502 may transition to a valid known state.

After the service provisioning is done (i.e. the service provisioning state 506 is service provisioning created status), the signaling engine 502 may remain in a START state until the optical fabric unit 412 is provisioned for the first time. After the optical fabric unit 412 is provisioned for the first time, the signaling engine 502 may move to a FIRST_RAMP_INPROGRESS state.

The signaling engine 502 may move to a LCK_ISSUED_WAIT_FOR_DELETE state when the lock command is issued and the fabric state 504 is still fabric unblocked status. The signaling engine 502 may wait in this state until the connection in the optical fabric unit 412 is deleted. After the connection is deleted in the optical fabric unit 412, the signaling engine 502 may transition to DELETED state. When the lock command is cleared and the connection in the optical fabric unit 412 is to be created again, the signaling engine 502 may wait in a LCK_RELEASE_WAIT_FOR_RAMP state until the fabric state 504 becomes fabric unblocked status again. When the lock command is cleared, the connection in the optical fabric unit 412 is unblocked, and the ramp process is in-progress, the signaling engine moves to a LCK_RELEASE_RAMP_INPROGRESS state. Once the ramp process is completed, the signaling engine 502 may move to NORM_RAMP_COMPLETE or NORM_RAMPED_ALARM_CONDITION based on the alarm state 512 being present.

Figure 6A:
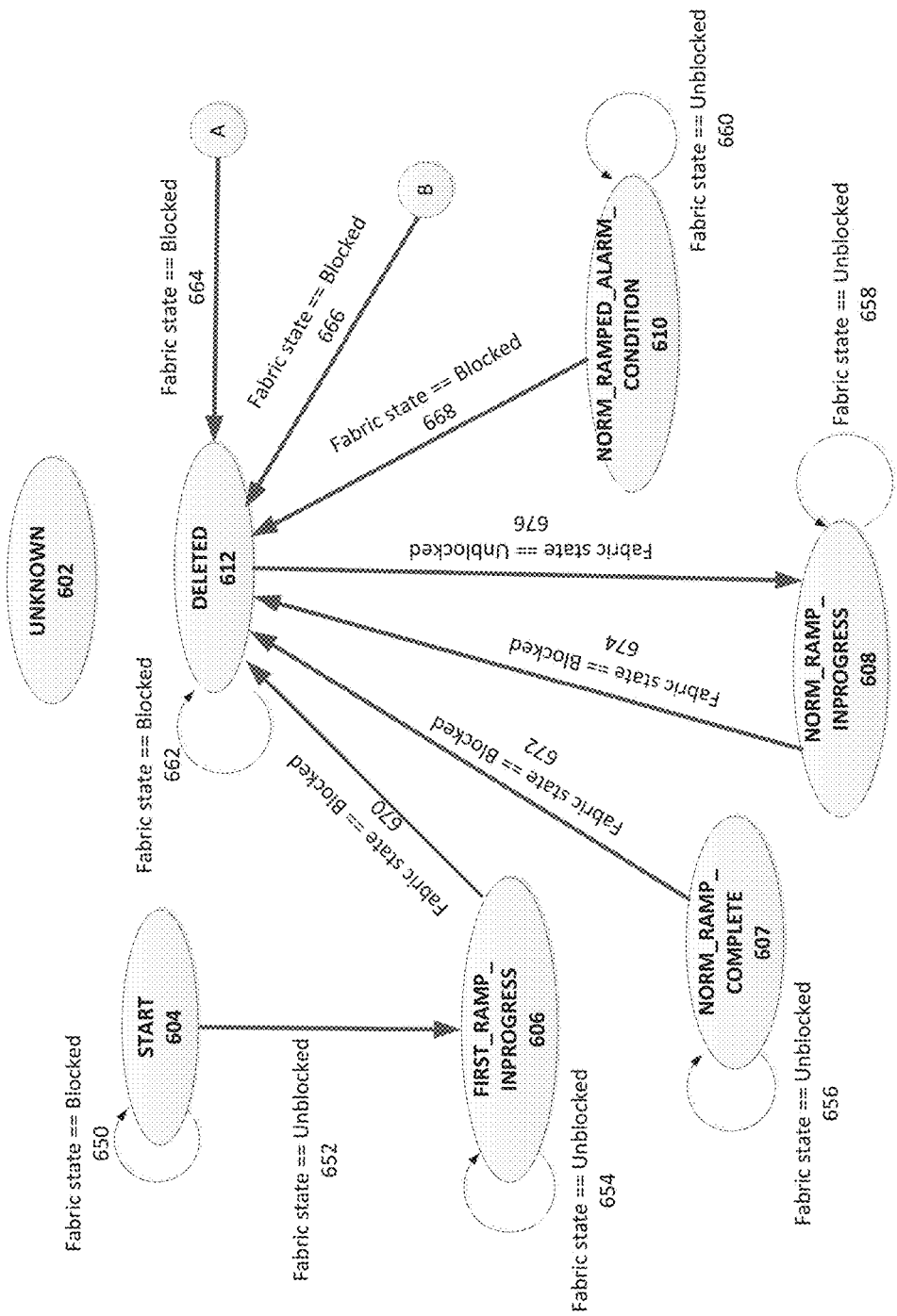
FIG. 6A is a diagram illustrating state transitions in a signaling engine based on a fabric state as an input state variable.
Figure 6B:
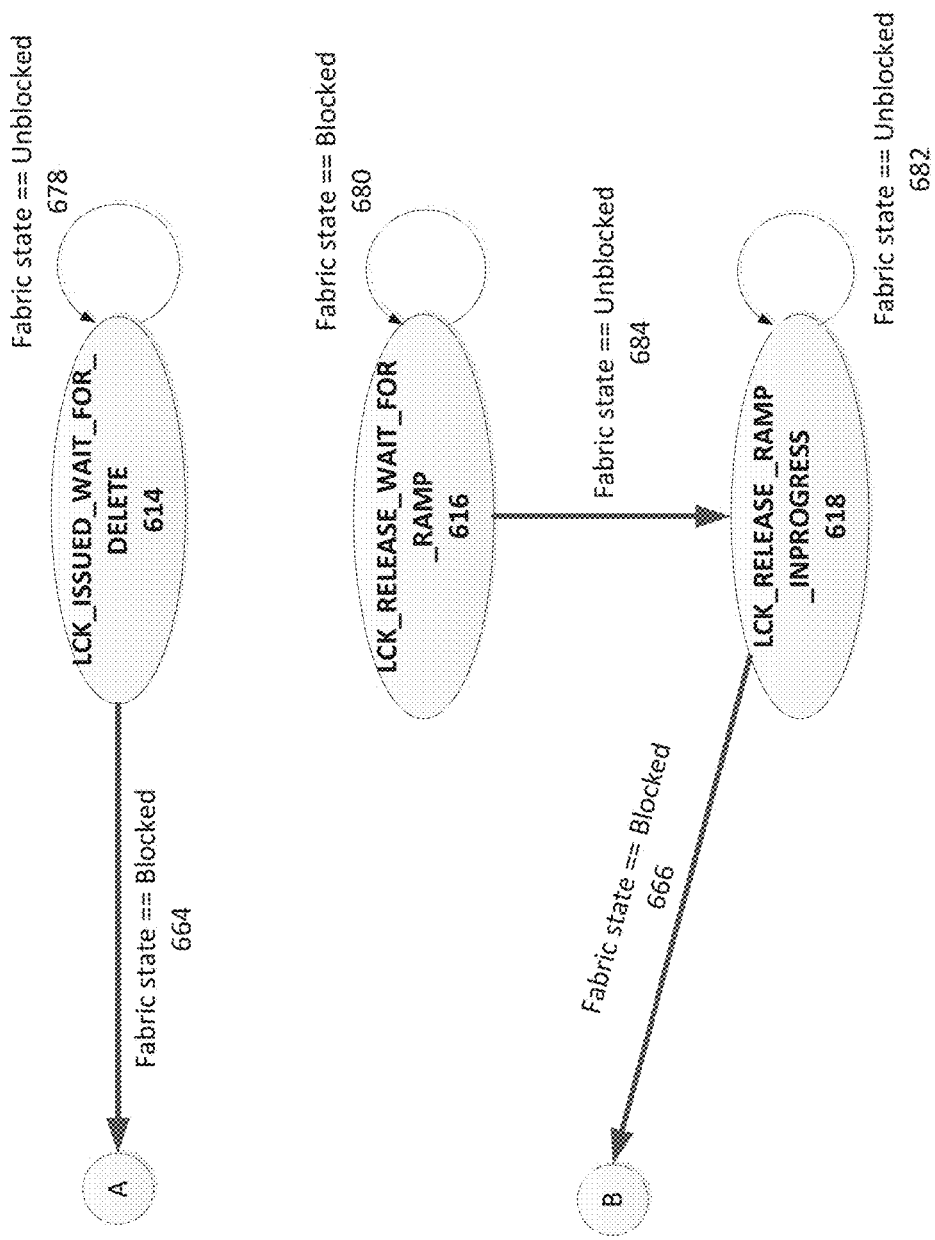
FIG. 6B is a continuation of FIG. 6A.

FIGS. 6A and 6B illustrate the state transitions in a signaling engine 502 based on a fabric state 504 as input state variable. An UNKNOWN state 602 may be the default state with which the signaling engine 502 is initialized to when some or all of the state variables is unknown after the system reboots. Until all the state variables are in some known state, the transitions to other states may be avoided. Once all the state variables are in the known state, based on the STORED_STATE which was read from the persistence device, the signaling engine 502 may transition to a valid known state.

After the service provisioning is done (i.e. the service provisioning state 506 is service provisioning created status), the signaling engine 502 may remain in a START state 604 until the optical fabric unit 412 is provisioned for the first time. For example, if the received fabric state 504 is fabric unblocked status 650, the signaling engine 502 may remain in a START state 604. If the optical fabric unit 412 is provisioned for the first time and the received fabric state 504 is fabric unblocked status 652, the signaling engine 502 may move to a FIRST_RAMP_INPROGRESS state 606. As long as the received fabric state 504 is fabric unblocked status 654, the signaling engine 502 may remain in the FIRST_RAMP_INPROGRESS state 606. However, if the received fabric state 504 changes to fabric blocked status 670, the signaling engine 502 may move to DELETED status 612 from the FIRST_RAMP_INPROGRESS state 606.

As described above, when the ramp process is completed and there are no alarm conditions present, the signaling engine 502 may transition to a NORM_RAMP COMPLETE state 607. In this state, as long as the received fabric state 504 is fabric unblocked status 656, the signaling engine 502 may remain in the NORM_RAMP_COMPLETE state 607. However, if the received fabric state 504 changes to fabric blocked status 672, the signaling engine 502 may move to DELETED status 612 from the NORM_RAMP_COMPLETE state 607.

When the signaling engine 502 is in DELETED status 612, if the received fabric state 504 is fabric unblocked status 676, the signaling engine 502 may move to NORM_RAMP_INPROGRESS state 608 from the DELETED status 612. In this state, as long as the received fabric state 504 is fabric unblocked status 658, the signaling engine 502 may remain in the NORM RAMP INPROGRESS state 608. However, if the received fabric state 504 changes to fabric blocked status 674, the signaling engine 502 may move back to DELETED status 612 again.

When the ramp process is completed and there is an alarm condition present which is indicated by the power monitoring unit 416, the signaling engine 502 may move to a NORM_RAMPED_ALARM CONDITION state 610. If the signaling engine 502 is in this state, the signaling engine 502 may send FDI downstream. As long as the received fabric state 504 is fabric unblocked status 660, the signaling engine 502 may remain in the NORM_RAMPED_ALARM_CONDITION state 610. However, if the received fabric state 504 changes to fabric blocked status 668, the signaling engine 502 may move to DELETED status 612 from the NORM_RAMPED_ALARM CONDITION state 610.

If a network operator issued a lock command (i.e. a received lock state 508 is locked status) and the fabric state 504 is fabric unblocked status 678, the signaling engine 502 may move to a LCK_ISSUED_WAIT_FOR_DELETE state 614. In this state, if the received fabric state 504 changes to fabric blocked status 664, the signaling engine 502 may move to DELETED status 612 from the LCK_ISSUED_WAIT_FOR_DELETE state 614. When the network operator issues an unlock command (i.e. the received lock state 508 is unlock status) and the connection in the optical fabric unit 412 is to be created again, the signaling engine 502 may wait in a LCK_RELEASE_WAIT_FOR_RAMP state 616 until the fabric state 504 becomes fabric unblocked status 684 again. As long as the received fabric state 504 is fabric blocked status 680, the signaling engine 502 may remain in the LCK_RELEASE_WAIT_FOR_RAMP state 616. However, if the received fabric state 504 changes to fabric unblocked status 684, the signaling engine 502 may move to LCK_RELEASE_RAMP_INPROGRESS state 618 from the LCK_RELEASE_WAIT_FOR_RAMP state 616. If the received lock state 508 is unlock status and the received fabric state 504 is fabric unblocked status 682 which means a ramp process in-progress, the signaling engine 502 may moves to a LCK_RELEASE_RAMP_INPROGRESS state 618. However, if the received fabric state 504 changes to fabric blocked status 666, the signaling engine 502 may move to DELETED state 612 from the LCK_RELEASE_RAMP_INPROGRESS state 618.

Figure 7A:
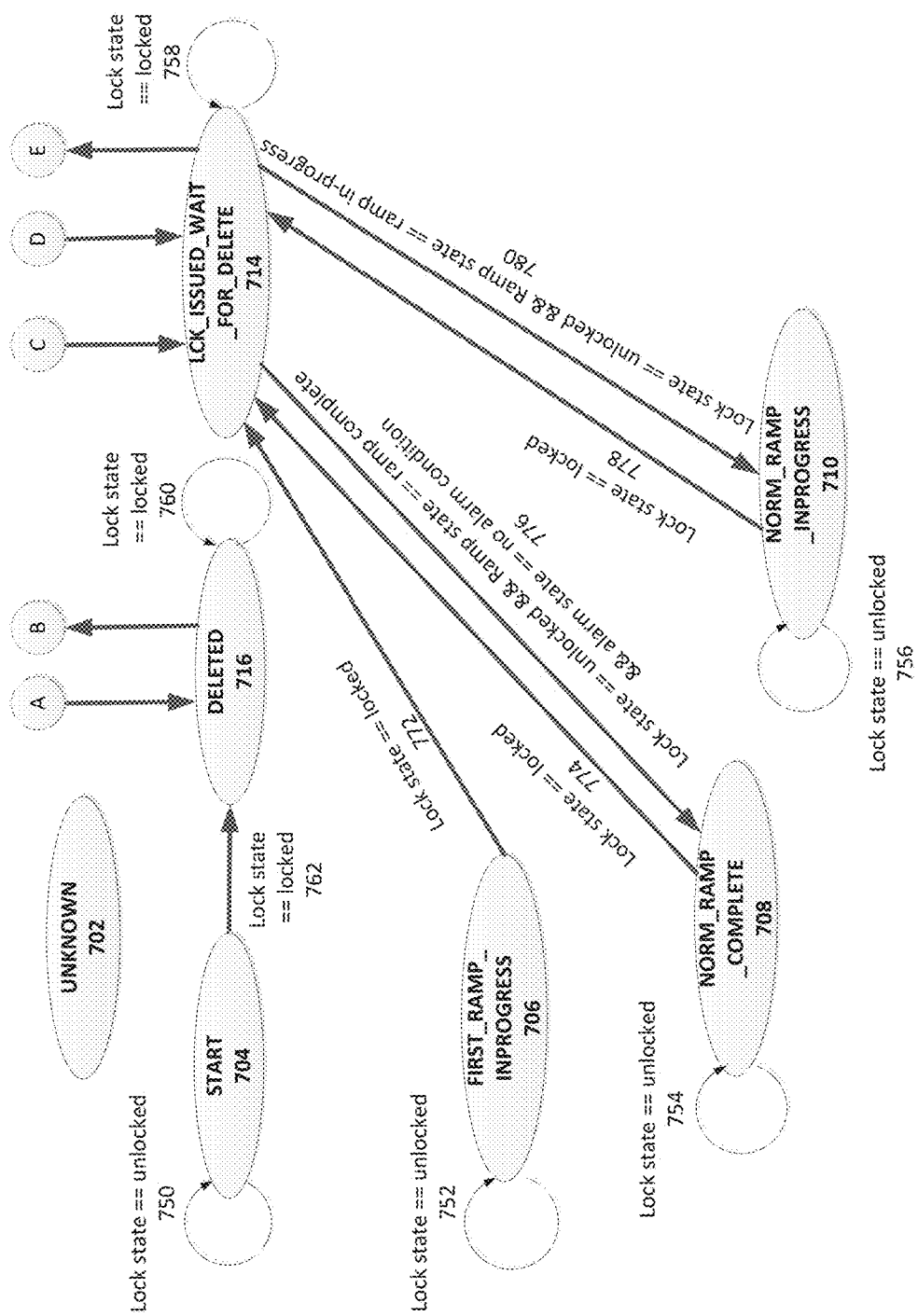
FIG. 7A is a diagram illustrating state transitions in a signaling engine based on a lock state as an input state variable.
Figure 7B:
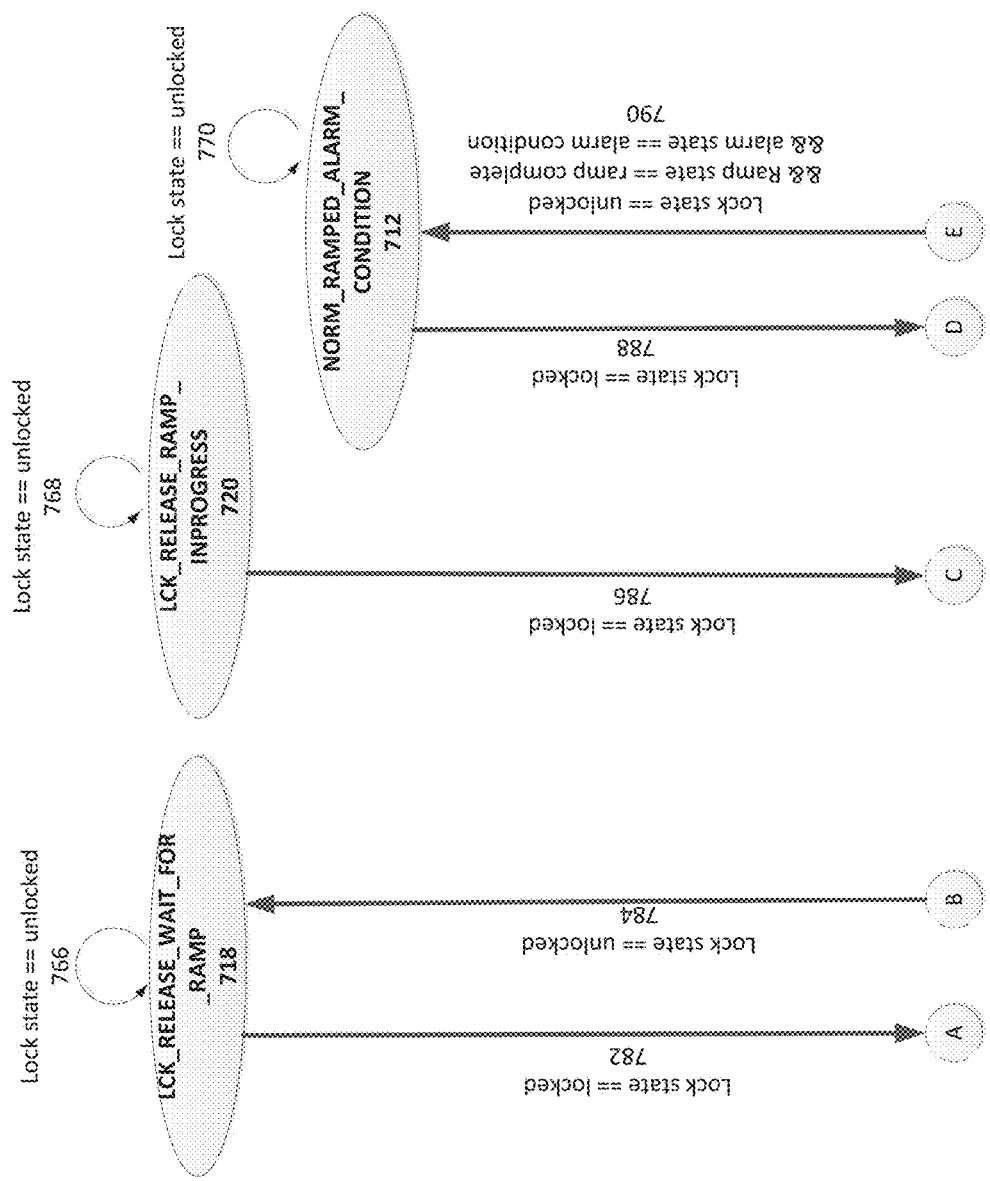
FIG. 7B is a continuation of FIG. 7A.

FIGS. 7A and 7B illustrate the state transitions in a signaling engine 502 based on a lock state 508 as input state variable. As described above, an UNKNOWN state 702 may be the default state with which the signaling engine 502 is initialized to when some or all of the state variables is unknown after the system reboots. Until all the state variables are in some known state, the transitions to other states may be avoided. Once all the state variables are in the known state, based on the STORED_STATE which was read from the persistence device, the signaling engine 502 may transition to a valid 'known' state.

After the service provisioning is done (i.e. the service provisioning state 506 is service provisioning created status), the signaling engine 502 may remain in a START state 704 until the optical fabric unit 412 is provisioned for the first time. For example, in this START state 704, if a network operator keeps the CTP as unlocked (i.e. the received lock state 508 is unlocked status 750), the signaling engine 502 may still remain in the START state 704. However, if the network operator issues a lock command at this point (i.e. the received lock state 508 is locked status 762), the signaling engine 502 may move to a DELETED state 716. If the optical fabric unit 412 is provisioned for the first time and the received fabric state 504 is fabric unblocked status, the signaling engine 502 may move to a FIRST_RAMP_INPROGRESS state 706. In this state, even if the network operator keeps the CTP as unlocked (i.e. the received lock state 508 is unlocked status 752), the signaling engine 502 may remain in the FIRST_RAMP_INPROGRESS state 706. However, if the network operator issues a lock command (i.e. the received lock state 508 is locked status 772), the signaling engine 502 may move to a LCK_ISSUED_WAIT_FOR_DELETE state 714. The signaling engine 502 may wait in this state until the connection in the optical fabric unit 412 is deleted.

When the ramp process is completed and there are no alarm conditions present, the signaling engine may transition to a NORM_RAMP_COMPLETE state 708. In this state, the signaling engine 502 may not change its state if the CTP continues to be in unlocked state (i.e. the received lock state 508 is unlocked status 754). However, if the network operator issues a lock command (i.e. the received lock state 508 is locked status 774), the signaling engine 502 may move to a LCK_ISSUED_WAIT_FOR_DELETE state 714. While waiting for the connection in the optical fabric unit 412 to be deleted, if the signaling engine 502 receives: (1) a lock state 508 indicating unlocked status; (2) a ramp state 510 indicating ramp complete status; and (3) an alarm state 512 indicating no alarm condition status 776, the signaling engine 502 may move back to the NORM_RAMP_COMPLETE state 708 from the LCK_ISSUED_WAIT_FOR_DELETE state 714.

Once the ramp process is completed and there is an alarm condition present indicating that the power level of the super-channel measured by the power monitoring unit 416 is below the reliability threshold, the signaling engine 502 may move to a NORM_RAMPED_ALARM_CONDITION state 712. As described above, the signaling engine 502 may send FDI downstream in this state. In this state, if the network operator issues a lock command (i.e. the received lock state 508 is locked status 788), the signaling engine 502 may move to a LCK_ISSUED_WAIT_FOR_DELETE state 714. While waiting for the connection in the optical fabric unit 412 to be deleted, if the signaling engine 502 receives: (1) a lock state 508 indicating unlocked status; (2) a ramp state 510 indicating ramp complete status; and (3) an alarm state 512 indicating alarm condition status 790, the signaling engine 502 may move back to the NORM_RAMPED_ALARM_CONDITION state 712 from the LCK_ISSUED_WAIT_FOR_DELETE state 714.

As described above, the signaling engine 502 may wait in the LCK_ISSUED_WAIT_FOR_DELETE state 714 until the connection in the optical fabric unit 412 is deleted. While the signaling engine 502 is in DELETED state 716, if the network operator issues an unlock command (i.e. the received lock state 508 is unlocked status 784) and the connection in the optical fabric unit 412 is to be created again, the signaling engine 502 may move to a LCK_RELEASE_WAIT_FOR_RAMP state 718. If the network operator issues a lock command again (i.e. the received lock state 508 is locked status 782), the signaling engine 502 may move to the DELETED state 716 from the LCK_RELEASE_WAIT_FOR_RAMP state 718. While the signaling engine 502 is in the LCK_RELEASE_WAIT_FOR_RAMP state 718, even if the network operator issues an unlock command (i.e. the received lock state 508 is unlocked status 766), that may not affect the state transition of the signaling engine 502.

The signaling engine 502 may move to a LCK_RELEASE_RAMP_INPROGRESS state 720 if it receives: (1) a lock state 508 indicating unlocked status 768; (2) a fabric state 504 indicating fabric unblocked status; and (3) a ramp state 510 indicating ramp in-progress status. In this state, if the network operator issues a lock command again (i.e. the received lock state 508 is locked status 786), the signaling engine 502 may move to the DELETED state 716 from the LCK_RELEASE_RAMP_INPROGRESS state 720.

Figure 8A:
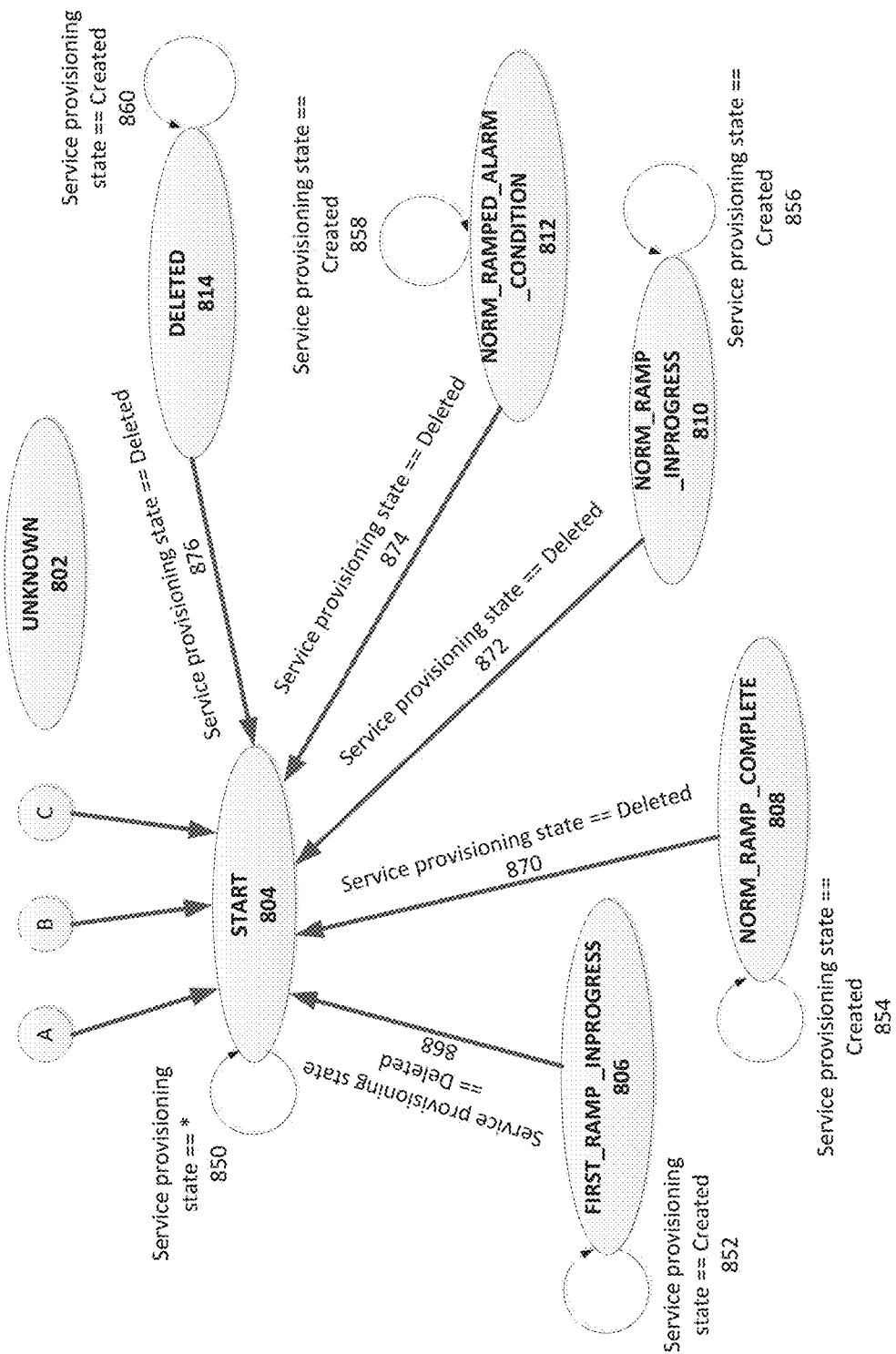
FIG. 8A is a diagram illustrating state transitions in a signaling engine based on a service provisioning state as an input state variable.
Figure 8B:
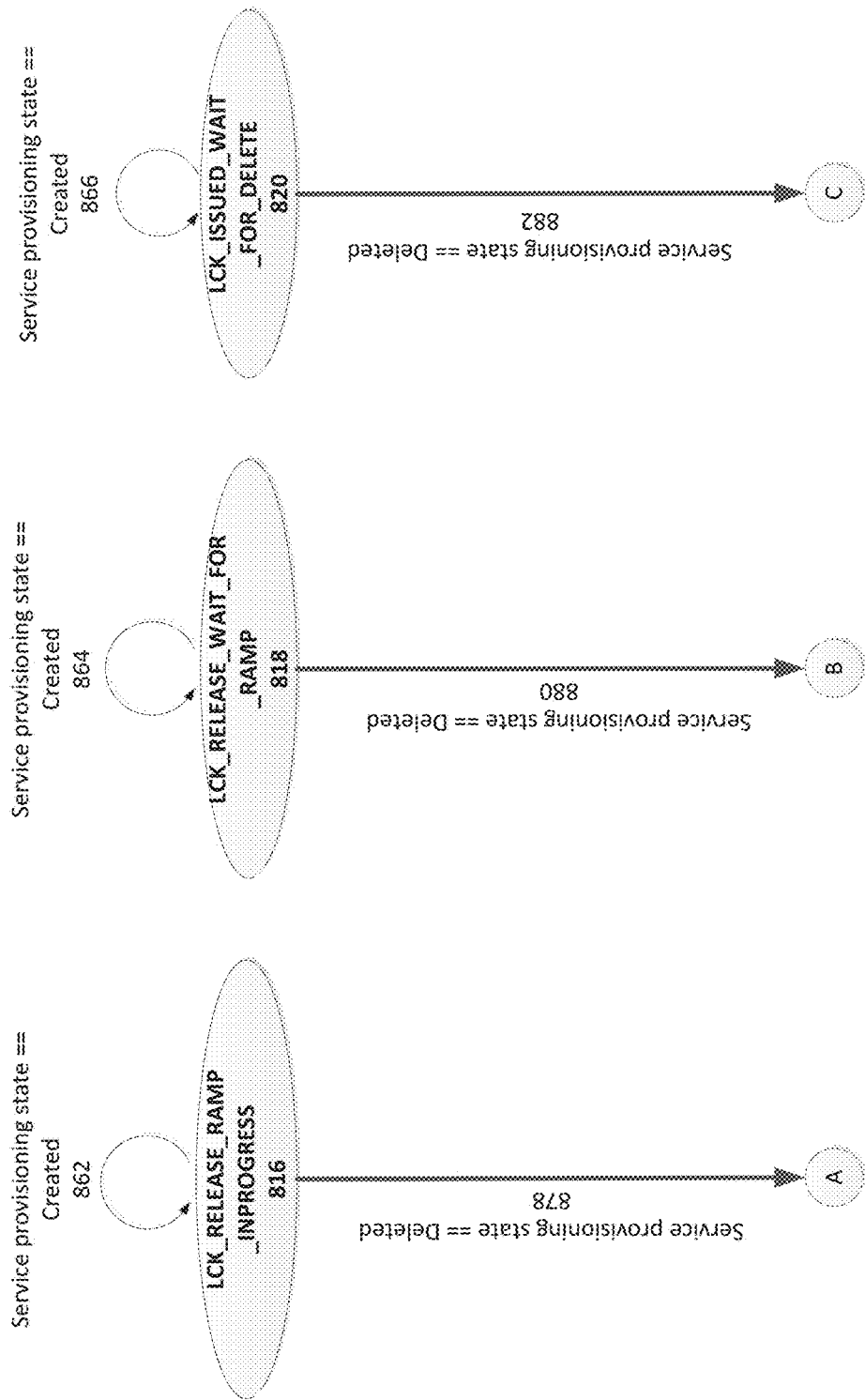
FIG. 8B is a continuation of FIG. 8A.

FIGS. 8A and 8B illustrate the state transitions in a signaling engine 502 based on a service provisioning state 506 as input state variable. An UNKNOWN state 802 may be the default state with which the signaling engine 502 is initialized to when some or all of the state variables is unknown after the system reboots. Until all the state variables are in some known state, the transitions to other states may be avoided. Once all the state variables are in the known state, based on the STORED_STATE which was read from the persistence device, the signaling engine 502 may transition to a valid 'known' state.

Once a network operator initiates service provisioning in the optical fabric unit 412, the signaling engine 502 may move to a START state 804 and remain in the state until the service provisioning is done in the optical fabric unit 412. While in this state, the signaling engine 502 may not be affected whether or not the received service provisioning state 506 is service provisioning created status or service provisioning deleted status 850. After the pass-band is provisioned in the optical fabric unit 412 with fabric status as received as fabric unblocked, the signaling engine 502 may move to a FIRST_RAMP_INPROGRESS state 806. While in this state, if the network operator deletes the service provisioning (i.e. the received service provisioning state 506 is service provisioning deleted status 868), the signaling engine 502 may move back to the START state 804 from the FIRST_RAMP_INPROGRESS state 806.

When the ramp process is completed and there are no alarm conditions present, the signaling engine may transition to a NORM_RAMP_COMPLETE state 808. With respect to the service provisioning state 506, as long as the signaling engine 502 receives service provisioning created status 854 and other states are not changed, it may remain in the NORM_RAMP_COMPLETE state 808. However, it the signaling engine 502 receives service provisioning deleted status 870, the signaling engine 502 may move back to the START state 804 from the NORM_RAMP_COMPLETE state 808.

Once the ramp process is completed and there is an alarm condition present that is indicated by the power monitoring unit 416, the signaling engine 502 may move to a NORM_RAMPED_ALARM_CONDITION state 812. With respect to the service provisioning state 506, as long as the signaling engine 502 receives service provisioning created status 858 and other states are not changed, it may remain in the NORM_RAMPED_ALARM_CONDITION state 812. However, if the signaling engine 502 receives service provisioning deleted status 874, the signaling engine 502 may move back to the START state 804 from the NORM_RAMP_COMPLETE state 808.

Due to upstream failure conditions or issuance of the lock command by a network operator, when the connection in the optical fabric unit 412 is deleted, the signaling engine 502 may transition to a DELETED state 814. If the signaling engine 502 receives service provisioning deleted status 876, the signaling engine 502 may move back to the START state 804 from the DELETED state 814.

The signaling engine 502 may move to a NORM_RAMP_INPROGRESS state 810 when upstream failure is rectified or the power of super-channels that are already ramped up is adjusted again. If the signaling engine 502 receives service provisioning deleted status 872, the signaling engine 502 may transition to the START state 804 from the NORM_RAMP_INPROGRESS state 810.

The signaling engine 502 may move to a LCK_ISSUED_WAIT_FOR_DELETE state 820 when the lock command is issued and pass-band in the fabric is still to be deleted. The signaling engine 502 may wait in this state until the connection in the optical fabric unit 412 is deleted. After the received service provisioning state 506 is service provision deleted status 882 the signaling engine 502 may transition to the START state 804. When the lock command is cleared and the connection in the optical fabric unit 412 is to be created again, the signaling engine 502 may wait in a LCK_RELEASE_WAIT_FOR_RAMP state 818. Once the received service provisioning state 506 is service provisioning deleted status 880, the signaling engine 502 may transition to the START state 804.

When the lock command is cleared, the connection in the optical fabric unit 412 is unblocked and the ramp process is in-progress (i.e. the received ramp state 510 is ramp in-progress status), the signaling engine may move to a LCK_RELEASE_RAMP_INPROGRESS state 816. In this state, if the signaling engine 502 receives service provisioning deleted status 878, the signaling engine 502 may transition to the START state 804.

Figure 9A:
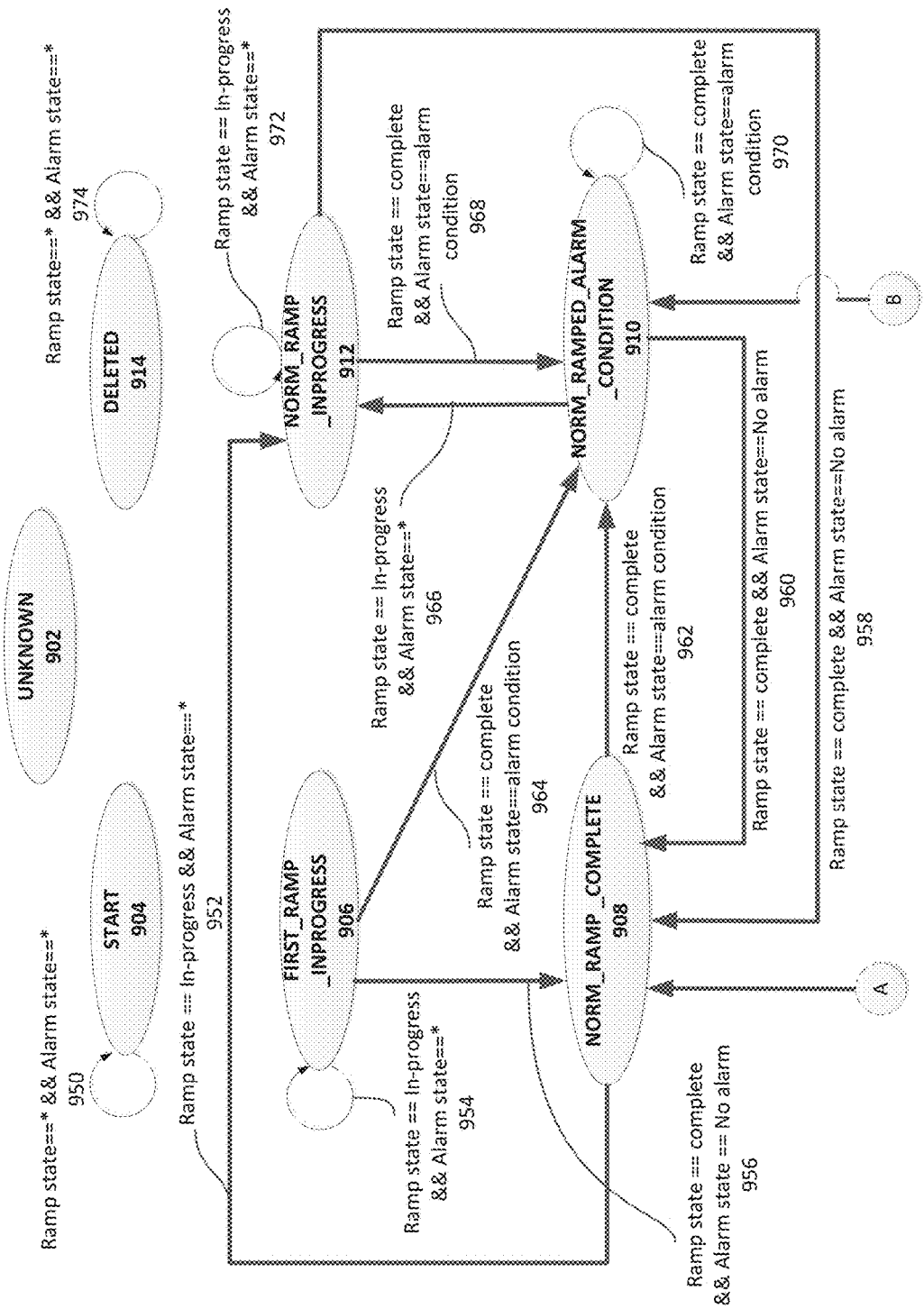
FIG. 9A is a diagram illustrating state transitions in a signaling engine based on a ramp state and an alarm state as input state variables.
Figure 9B:
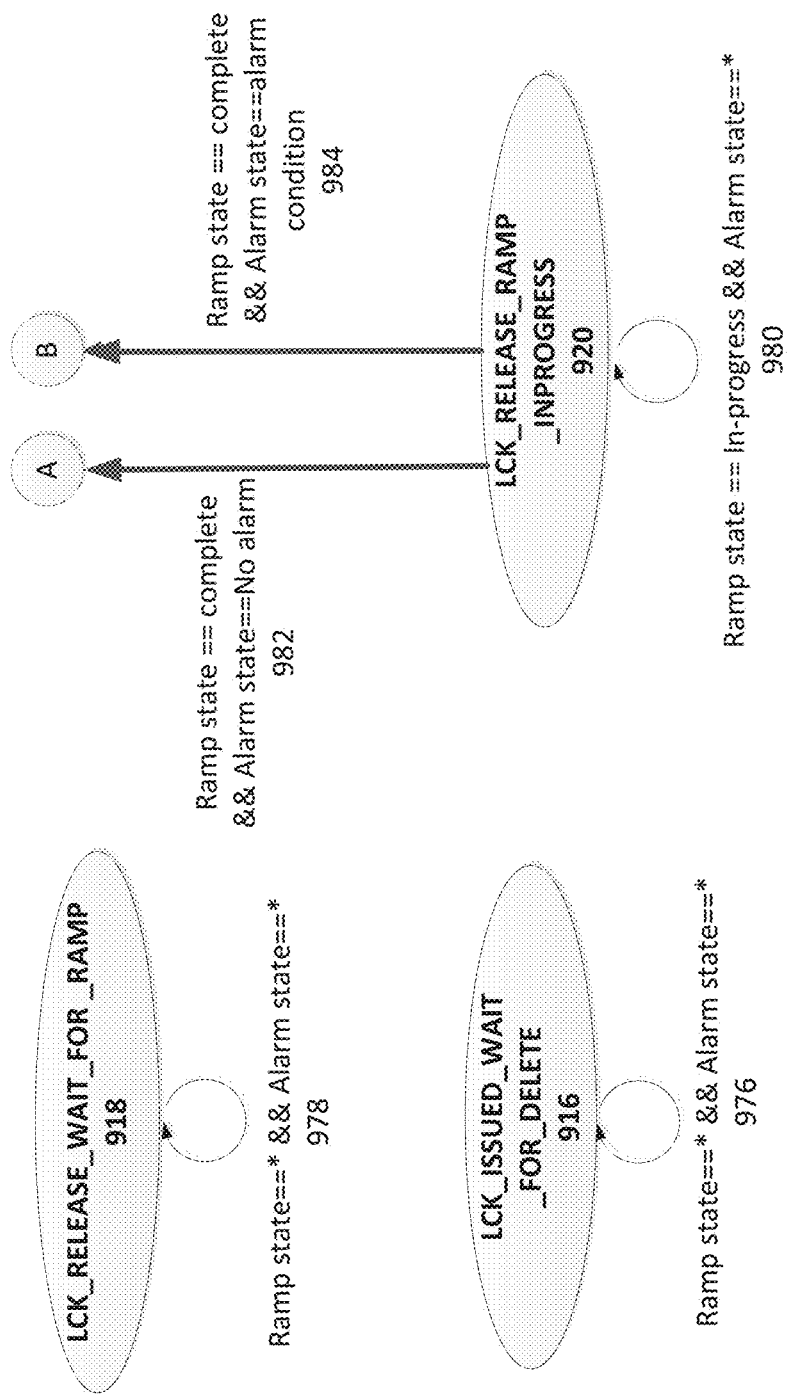
FIG. 9B is a continuation of FIG. 9A.

FIGS. 9A and 9B illustrate the state transitions in a signaling engine 502 based on a ramp state 510 and an alarm state 512 as input state variable. It should be noted that the ramp state 510 and alarm state 512 variables may be fed to the signaling engine 502 together to avoid any transient signaling after the ramp process is completed. For example, when the ramp process is completed after the power controller 410 was sending the OSC control unit 414 OCI or LCK signaling indications, a sole ramp status complete trigger to the power controller 410 may signal a clear indication to the downstream while there may be an outstanding alarm condition present that would have been indicated by an alarm condition status variable later as a separate trigger. Thus, once the ramp process completes if both ramp state 510 and alarm state 512 are fed together, such a momentary clear indication may be avoided. The power controller 410 may directly signal FDI from OCI or LCK indications. Such momentary clear indications otherwise may give a false sense of clean condition to NEs in the optical network system, and therefore need to be avoided.

Referring to FIGS. 9A and 9B, an UNKNOWN state 902 may be the default state with which the signaling engine 502 is initialized to when some or all of the state variables is unknown after the system reboots. Until all the state variables are in some known state, the transitions to other states may be avoided. Once all the state variables are in the known state, based on the STORED_STATE which was read from the persistence device, the signaling engine 502 may transition to a valid known state.

Once a network operator initiates service provisioning in the optical fabric unit 412, the signaling engine 502 may move to a START state 804 and remain in the state until the pass-band provisioning is done in the optical fabric unit 412 for the first time. While in this state, the signaling engine 502 may not be affected by the ramp state 510 and alarm state 512 because the ramp process is not completed yet. Thus, the received ramp state 510 may be any status 950 including ramp complete status or ramp in progress status. The received alarm state 512 may be any status 950 including alarm condition status or no alarm status. In this state, the signaling engine 502 may ignore the ramp state 510 and alarm state 512 until the pass-band is created in the optical fabric unit 412.

After the pass-band in the optical fabric unit 412 is provisioned for the first time and the ramp process is initiated (i.e. the received ramp state 510 is ramp in-progress status 954), the signaling engine 502 may move to a FIRST_RAMP_INPROGRESS state 906. While remaining in this state or during this state, the signaling engine 502 may ignore the alarm state 512 because the ramp process is not completed. Specifically, the measured power level during the ramp process (i.e. the ramp state is the ramp in-progress status) may be ignored as it is possible that the low power level measured by the power monitoring unit 416 is because the ramp process is not completed. When the ramp process is completed (i.e. the received ramp state 510 is ramp complete status 956) and there are no alarm conditions present (i.e. the received alarm state 512 is no alarm condition 956), the signaling engine may transition to a NORM_RAMP_COMPLETE state 908.

Once the ramp process is completed (i.e. the received ramp state 510 is ramp complete status 962) and there occurs an alarm condition indicating low power level of the super-channel (i.e. the received alarm state 512 is alarm condition status 962), the signaling engine 502 may move to a NORM_RAMPED_ALARM_CONDITION state 910. The signaling engine 502 may send FDI downstream in this state. Due to upstream failure conditions or issuance of the lock command by a network operator, when the connection in the optical fabric unit 412 is deleted, the signaling engine may transition to a DELETED state 914 regardless of the ramp state and the alarm state 974. In other words, once the received fabric state 504 is fabric blocked status, the signaling engine 502 switches to the DELETED state 914 whatever states the signaling engine 502 receives with respect to the ramp state and the alarm state.

From the NORM_RAMPED_ALARM_CONDITION state 910, the signaling engine 502 may move to a NORM_RAMP_INPROGRESS state 912 when the received ramp state 510 is ramp in-progress status 966 regardless of the alarm state 966. However, if the received ramp state 510 is ramp complete status 960 and the received alarm state includes no alarm status 960, the signaling engine 502 may move back to the NORM_RAMP_COMPLETE state 908. In addition, when the signaling engine 502 is in the NORM_RAMP_INPROGRESS state 912, if the received ramp state 510 is ramp complete status 958 and the received alarm state 512 is no alarm condition 958, the signaling engine 502 may move to the NORM_RAMP_COMPLETE state 908.

The signaling engine 502 may move to a LCK_ISSUED_WAIT_FOR_DELETE state 916 when the lock command is issued and the fabric state 504 is still fabric unblocked status. The signaling engine 502 may wait in this state until the connection in the optical fabric unit 412 is deleted. After the connection is deleted in the optical fabric unit 412, the signaling engine 502 may transition to DELETED state 914. When the lock command is cleared and the connection in the optical fabric unit 412 is to be created again, the signaling engine 502 may move to a LCK_RELEASE_WAIT_FOR_RAMP state 918. The signaling engine 502 may remain in the LCK_RELEASE_WAIT_FOR_RAMP state 918 until the fabric state 504 becomes fabric unblocked status again. When the lock command is cleared, the connection in the optical fabric unit 412 is unblocked, and the ramp process is in-progress (i.e. the received ramp state 510 is ramp in-progress status 980), the signaling engine moves to a LCK_RELEASE_RAMP_INPROGRESS state 920 regardless of the alarm state 980. Once the ramp process is completed (i.e. the received ramp state 510 is ramp complete status 982) and there is no alarm condition (i.e. the received alarm state 512 is no alarm condition status 982), the signaling engine may move to the NORM_RAMP_COMPLETE state 908 from the LCK_RELEASE_RAMP_INPROGRESS state 920. However, although the ramp process is completed (i.e. the received ramp state 510 is ramp complete status 984), but there is an alarm condition indicating low power level of the super-channel (i.e. the received alarm state 512 is alarm condition status 984), the signaling engine may move to the NORM_RAMPED_ALARM_CONDITION state 910 from the LCK_RELEASE_RAMP_INPROGRESS state 920.

Figure 10:
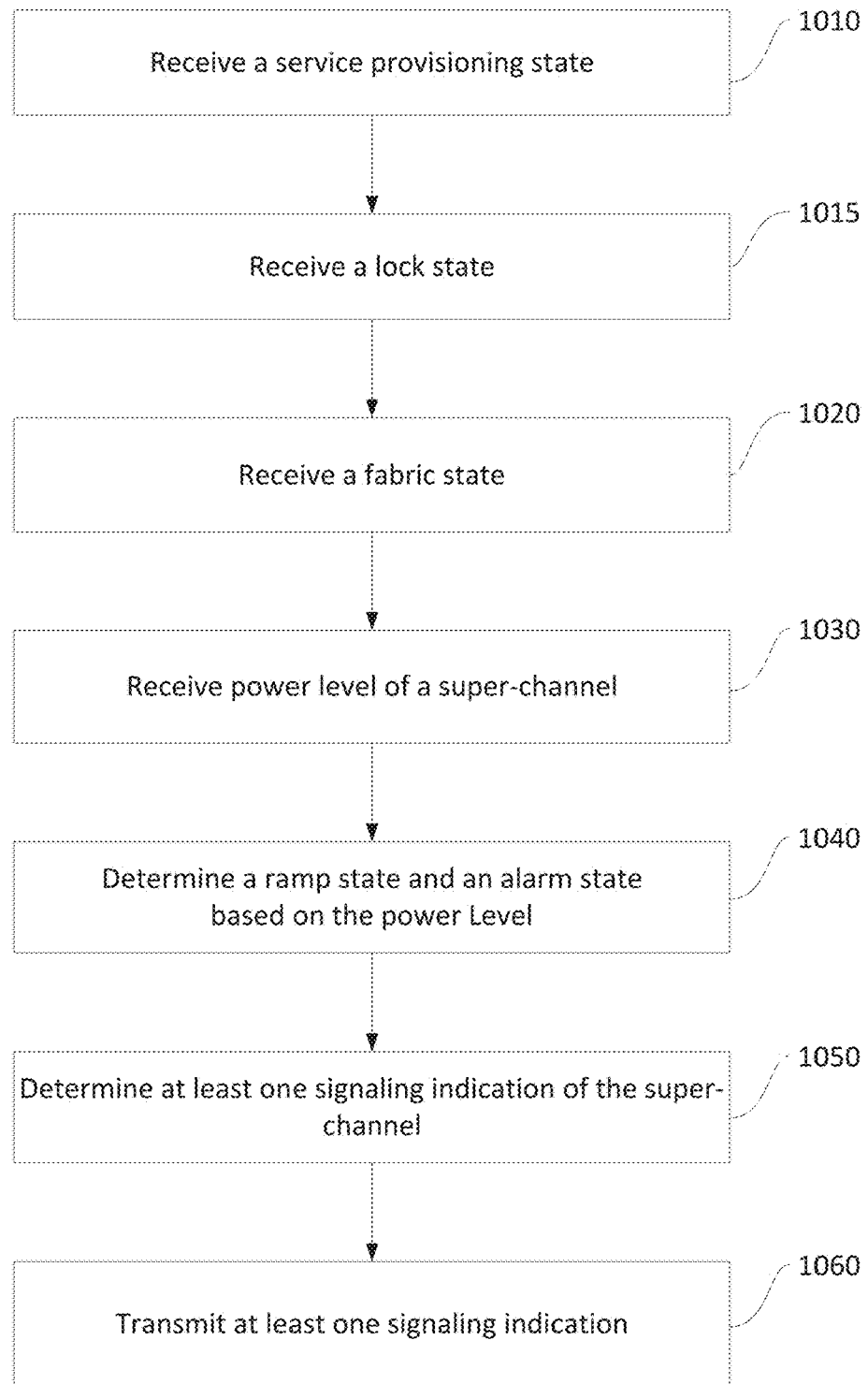
FIG. 10 is a flow diagram illustrating an example procedure for providing at least one signaling indication by a power controller.

FIG. 10 is a flow diagram illustrating an example procedure for providing at least one signaling indication of a super-channel by a power controller 410. For example, at step 1010, the power controller 410 may receive a service provisioning state of the super-channel from a network management entity. Service provision may refer to association of multiple trail endpoints in an optical fabric unit 412 so that a super-channel flows from one trail endpoint to the other trail endpoint. The service provisioning state may indicate whether a network operator or user created or deleted the association of multiple trail end-points in the optical fabric unit 412. If the network operator initiates the service provisioning (i.e. the association of multiple trail end-points is created), the power controller 410 may determine the service provisioning state as service provisioning created status. If the network operator ceases the service provisioning (i.e. the association of multiple trail end-points is deleted), the power controller may determine the service provisioning state as service provisioning deleted status.

At step 1015, the power controller 410 may receive a lock state from the network management entity. The lock state received from the network management entity may indicate whether the network management entity issued a lock command or an unlock command on a management object representing the super-channel. If the received lock state indicates that the network management entity issued a lock command, the power controller 410 may determine the lock state of the super-channel as locked status. If the received lock state indicates that the network management entity issued an unlock command, the power controller 410 may determine the lock state of the super-channel as unlocked status.

At step 1020, the power controller 410 may receive a fabric state of the super-channel from an optical fabric unit 412. The fabric state may indicate whether a pass-band of the super-channel is provisioned or not. A passband is the range of frequencies or wavelengths that can pass through the switching array of the optical fabric unit 412. If the pass-band of the super-channel is provisioned in the optical fabric unit 412, the power controller 410 may determine the fabric state as fabric unblocked status. If the pass-band of the super-channel is not provisioned in the optical fabric unit 412, the power controller 410 may determine the fabric state as fabric blocked status.

At step 1030, the power controller 410 may receive a power level of the super-channel at a line fiber measured by a power monitoring unit 416. The power monitoring unit 416 may be an Optical Power Monitor (OPM). Based on the measured power level and an attenuation level of the super-channel, at step 1040, the power controller 410 may determine a ramp state in the optical fabric unit 412. The ramp state may indicate whether or not the power level of the super-channel reached to a predetermined target launch power level. For example, if a pass-band of the super-channel is provisioned in the optical fabric unit 412 (i.e. the fabric state is the fabric unblocked) and the power level of the super-channel is reached to the target launch power, the power controller 410 may determine the ramp state as ramp complete status. If the pass-band of the super-channel is provisioned in the optical fabric unit 412 (i.e. the fabric state is the fabric unblocked) and the power level of the super-channel is not reached to the target launch power, the power controller 410 may determine the ramp state as ramp in-progress status.

Also at step 1040, the power controller 410 may determine an alarm state based on the measured power level of the super-channel. The alarm state may represent whether or not the power of the super-channel is very low serving as a condition to signal FDI downstream. Generally, a threshold value determining that the power level is too low is the reliability threshold value of the power monitoring unit 416. For example, if the ramp state is the ramp complete status and the measured power level of the super-channel is lower than a reliability threshold value, then the power controller 410 may determine the alarm state as alarm condition status or alarm zone status. On the contrary, if the ramp state is the ramp complete status and the measure power level of the super-channel is higher than the reliability threshold value, the power controller 410 may determine the alarm state as no alarm condition status.

After receiving the service provisioning state, the lock state, the fabric state, the ramp state, and the alarm state, at step 1050, the power controller 410 may determine at least one signaling indication of the super channel based on the received states. The signaling indication of the super channel may include an open connection indication (OCI), a lock indication (LCK), a forward defect indication (FDI), a clear indication and the like. At step 1060, the power controller 410 may transmit the signaling indication to an optical supervisory channel (OSC) control unit 414

Upon receiving the signaling indications described above, the OSC control unit 414 may add the signaling indications into an OSC light wavelength 418. The OSC is an additional wavelength, which carries overhead information for network management and control purposes. Thus, the signaling indication in the OSC light wavelength may be transmitted as a trail overhead of the super-channel to the downstream network.

In an embodiment, after a lock state is cleared by a network operator, a lock indication (LCK) may be signaled continuously until the ramp process is complete. In another embodiment, after a lock state is cleared by a network operator, FDI may be signaled instead of the LCK that is signaled until the ramp process is complete. This may be a case where a desired signaling behavior is to discontinue LCK once the network operator removes the lock state. The FDI may be signaled continuously to indicate that the optical data path is down until the ramp process is complete.

In another embodiment, after the lock state is cleared by the network operator, until the ramp process is complete, the LCK may be signaled indefinitely if the ramp process cannot proceed due to an existing upstream failure condition in the network. In such a case, the LCK indication may be updated to FDI to indicate that the data path of the network is down due to the existing failure condition. This may be implemented based on a timer. Specifically, the timer may stipulate that if the ramp process is not complete within a certain time from the lock removal, the LCK indication may be updated to FDI. In another embodiment, after the lock state is cleared by a network operator, a signaling engine that runs a state machine may take into account various failure conditions. If a failure is present, the signaling engine may update the LCK indication to FDI.

In the implementation discussed in the pre-ceding sections, OCI is sourced till the first ramp doesn't complete after the user configuration of the service is done. In another embodiment, after the user configuration of the service is applied to an optical fabric unit, OCI may be signaled until the first ramp is in-progress. In another embodiment, the first ramp may not be completed due to an existing failure condition at the light source itself. In such cases, a Client Signal Fail (CSF) indication may be sourced along with the OCI indication to give a more clear indication of the underlying cause of OCI. That is, the OCI is not cleared because the ramp process is not completed yet due to the existing failure condition at the light source itself. The CSF indication may be sourced with the OCI indication after the service provisioning is done by the network operator. In such cases where the light source has a failure condition, a CSF signaling may also prevent a WDM system from restoring or protecting optical channels because there is no alternate path available to protect the traffic.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, metal-oxide semiconductor field-effect transistors (MOSFETs), ASICs, FPGAs circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor that implements aspects of the embodiments.

The suitable processors may include circuitry to implement the methods provided herein. The circuitry may include receiving circuitry, processing circuitry and transmitting circuitry.

The methods and flow charts provided herein may be implemented in a computer program, software, or firmware incorporated in a non-transitory computer-readable storage medium for execution by a general purpose computer or a processor. Examples of non-transitory computer-readable storage media, include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Further, the devices according to various embodiments described herein may be interspersed among other devices depending on the functionality of the microelectronic device. In addition, the number and components of the devices may vary depending on the functionality of the microelectronic device. By way of example, the number of correlators may vary from two to dozens.

What is claimed is:

1. A method for providing at least one signaling indication of a super-channel in a Wavelength Division Multiplexing (WDM) system, the method comprising:
   receiving, from a network management entity, a service provisioning state of the super-channel and a lock state of the super-channel;
   receiving, from an optical fabric unit, a fabric state of the super-channel, the fabric state indicates whether a pass-band of the super-channel is provisioned;
   receiving, from a power monitoring unit, a power level of the super-channel at a line fiber in the WDM system;
   determining a ramp state based on the power level and an attenuation level of the super-channel, the ramp state indicates whether the power level of the super-channel reached to a predetermined target launch power level;
   determining an alarm state based on the power level of the super channel;
   determining the at least one signaling indication of the super channel based on at least one of the service provisioning state, the lock state, the fabric state, the ramp state, or the alarm state;
   transmitting, to an optical supervisory channel (OSC) control unit, the at least one signaling indication,
   wherein the at least one signaling indication of the super channel includes an open connection indication (OCI), a lock indication (LCK), a forward defect indication (FDI), and a clear indication;
   passing the super-channel through a plurality of variable optical attenuators;
   controlling the variable optical attenuators based on the ramp state, such that the power level of the super-channel is ramped to the predetermined target launch power level; and
   transmitting the super-channel with the predetermined target launch power level.

2. The method of claim 1, wherein the super-channel indicates a group of multiple wavelengths that is originated from a light source.

3. The method of claim 1, wherein the service provisioning state of the super-channel indicates whether at least one association of multiple trail end-points for data flow of the super-channel is created or deleted across the optical fabric unit.

4. The method of claim 1, wherein the lock state of the super channel indicates whether the network management entity issued a lock command or an unlock command on a management object representing the super-channel.

5. The method of claim 1, further comprising:
   determining the predetermined target launch power level based on a spectrum width of the super-channel and a maximum amplifier launch power on a line fiber;
   increasing the attenuation level on a condition that the power level is higher than the predetermined target launch power level; and
   decreasing the attenuation level on a condition that the power level is lower than the predetermined target launch power level.

6. The method of claim 1, further comprising:
   determining the service provisioning state as a service provisioning created status based on the received service provisioning state;
   determining the service provisioning state as a service provisioning deleted status based on the received service provisioning state;
   determining the lock state as a locked status based on the received lock state;
   determining the lock state as an unlocked status based on the received lock state;
   determining the fabric state as a fabric unblocked status if the pass-band of the super-channel is provisioned in the optical fabric unit;
   determining the fabric state as a fabric blocked status if the pass-band of the super-channel is not provisioned in the optical fabric unit;
   determining the ramp state as a ramp complete status if the fabric state is the fabric unblocked and the power level of the super-channel reached to the predetermined target launch power level;
   determining the ramp state as a ramp in-progress status if the fabric state is the fabric unblocked and the power level of the super-channel has not reached to the predetermined target launch power level;
   determining the alarm state as an alarm condition status if the ramp state is the ramp complete status and the power level of the super-channel is lower than a predetermined threshold level; and
   determining the alarm state as a no alarm condition status if the ramp state is the ramp complete status and the power level of the super-channel is higher than the predetermined threshold level.

7. The method of claim 6, further comprising:
   if the ramp state is the ramp in-progress status and the service provisioning state is the service provisioning created status, transmitting the at least one signaling indication with the OCI; and
   if the ramp state is the ramp complete status and the service provisioning state is the service provisioning created status, transmitting the at least one signaling indication with the clear indication.

8. The method of claim 6, further comprising:
if the ramp state is the ramp complete status and the alarm state is the no alarm condition status, transmitting the at least one signaling indication with the clear indication;
if the ramp state is the ramp complete status and the alarm state is the alarm condition status, transmitting the at least one signaling indication with the FDI; and
if the ramp state is the ramp in-progress status, transmitting the at least one signaling indication with the FDI.

9. The method of claim 6, further comprising:
if the lock state is the locked status and the fabric state is the fabric unblocked status, transmitting the at least one signaling indication with the LCK; and
if the lock state is the unlocked status and the fabric state is the fabric blocked status, transmitting the at least one signaling indication with the LCK or FDI until the fabric state is the fabric unblocked status.

10. The method of claim 6, further comprising:
if the lock state is the unlocked status and the ramp state is the ramp in-progress status, transmitting the at least one signaling indication with the LCK or FDI until the ramp state is the ramp complete status; and
if the lock state is the unlocked status and the ramp state is the ramp complete status, transmitting the at least one signaling indication with the clear indication.

11. The method of claim 1, wherein the at least one signaling indication is included in an OSC light wavelength as a trail overhead of the super channel.

12. A Wavelength Division Multiplexing (WDM) system, comprising:
a wavelength selective switch that receives a super-channel including a plurality of optical signals and includes a plurality of variable optical attenuators: a processor configured to:
receive, from a network management entity, a service provisioning state of the super-channel and a lock state of the super-channel;
receive, from an optical fabric unit, a fabric state of the super-channel, the fabric state indicates whether a pass-band of the super-channel is provisioned;
receive, from a power monitoring unit, a power level of the super-channel in the optical fabric unit;
determine a ramp state based on the power level and an attenuation level of the super-channel, the ramp state indicates whether the power level of the super-channel reached to a predetermined target launch power level;
determine an alarm state based on the power level of the super channel;
determine at least one signaling indication of the super channel based on at least one of the service provisioning state, the lock state, the fabric state, the ramp state, or the alarm state; and
transmit, to an optical supervisory channel (OSC) control unit, the at least one signaling indication,
wherein the at least one signaling indication of the super channel includes an open connection indication (OCI), a lock indication (LCK), a forward defect indication (FDI), and a clear indication,
the super-channel is passed through the plurality of variable optical attenuators,
the processor controlling the variable optical attenuators based on the ramp state, such that the power level of the super-channel is ramped to the predetermined tart et launch power level; and
the super-channel is transmitted with the predetermined target launch power level after the ramping of the power level of the super-channel.

13. The WDM system of claim 12, wherein the service provisioning state of the super-channel indicates whether at least one association of multiple trail end-points for data flow of the super-channel is created or deleted across the optical fabric unit.

14. The WDM system of claim 12, wherein the lock state of the super channel indicates whether the network management entity issued a lock command or an unlock command on a management object representing the super-channel.

15. The WDM system of claim 12, further comprising:
determining the predetermined target launch power level based on a spectrum width of the super-channel and a maximum amplifier launch power on a line fiber;
increasing the attenuation level on a condition that the power level is higher than the predetermined target launch power level; and
decreasing the attenuation level on a condition that the power level is lower than the predetermined target launch power level.

16. The WDM system of claim 15, further comprising:
storing at least one state information based on the at least one signaling indication at a persistent device in the WDM system; and
determining the at least one signaling indication based on the at least one state information stored at the persistent device after the WDM system is rebooted,
wherein the persistent device is non-volatile while the WDM system is rebooting.

17. The WDM system of claim 12, further comprising:
determining the service provisioning state as a service provisioning created status based on the received service provisioning state;
determining the service provisioning state as a service provisioning deleted status based on the received service provisioning state;
determining the lock state as a locked status based on the received lock state;
determining the lock state as an unlocked status based on the received lock state;
determining the fabric state as a fabric unblocked status if the pass-band of the super-channel is provisioned in the optical fabric unit;
determining the fabric state as a fabric blocked status if the pass-band of the super-channel is not provisioned in the optical fabric unit;
determining the ramp state as a ramp complete status if the fabric state is the fabric unblocked and the power level of the super-channel reached to the predetermined target launch power level;
determining the ramp state as a ramp in-progress status if the fabric state is the fabric unblocked and the power level of the super-channel has not reached to the predetermined target launch power level;
determining the alarm state as an alarm condition status if the ramp state is the ramp complete status and the power level of the super-channel is lower than a predetermined threshold level; and
determining the alarm state as a no alarm condition status if the ramp state is the ramp complete status and the power level of the super-channel is higher than the predetermined threshold level.

18. The WDM system of claim 17, further comprising:
if the ramp state is the ramp in-progress status and the service provisioning state is the service provisioning created status, transmitting the at least one signaling indication with the OCI; and
if the ramp state is the ramp complete status and the service provisioning state is the service provisioning created status, transmitting the at least one signaling indication with the clear indication.

19. The WDM system of claim 17, further comprising:
if the ramp state is the ramp complete status and the alarm state is the no alarm condition status, transmitting the at least one signaling indication with the clear indication;
if the ramp state is the ramp complete status and the alarm state is the alarm condition status, transmitting the at least one signaling indication with the FDI; and
if the ramp state is the ramp in-progress status, transmitting the at least one signaling indication with the FDI.

20. The WDM system of claim 17, further comprising:
if the lock state is the locked status and the fabric state is the fabric unblocked status, transmitting the at least one signaling indication with the LCK; and
if the lock state is the unlocked status and the fabric state is the fabric blocked status, transmitting the at least one signaling indication with the LCK or FDI until the fabric state is the fabric unblocked status.

21. The WDM system of claim 17, further comprising:
if the lock state is the unlocked status and the ramp state is the ramp in-progress status, transmitting the at least one signaling indication with the LCK or FDI until the ramp state is the ramp complete status; and
if the lock state is the unlocked status and the ramp state is the ramp complete status, transmitting the at least one signaling indication with the clear indication.

22. A power control system comprising:
an optical fabric unit configured to generate a fabric state of a super-channel, the fabric state indicates whether a pass-band of the super channel is provisioned, the optical fabric unit including a plurality of variable optical attenuators;
a power monitoring unit configured to monitor a power level of the super-channel in the optical fabric unit; and
a power controller configured to:
receive, from a network management entity, a service provisioning state of the super-channel and a lock state of the super-channel;
determine a ramp state based on the power level and an attenuation level of the super-channel, the ramp state indicates whether the power level of the super channel reached to a predetermined target launch power level;
determine an alarm slate based on the power level of the super channel; and
determine at least one signaling indication of the super channel based on at least one of the service provisioning state, the lock state, the fabric state, the ramp state, or the alarm state,
wherein the at least one signaling indication of the super channel includes an open connection indication (OCI), a lock indication (LCK), a forward defect indication (FDI), and a clear indication,
the super-channel is passed through the plurality of variable optical attenuators,
the power controller controlling the variable optical attenuators based on the ramp state, such that the power level of the super-channel is ramped to the predetermined target launch power level, and
the super-channel is transmitted with the predetermined target launch power level after the ramping of the power level of the super-channel.

23. The power control system of claim 22, wherein the optical fabric unit is further configured to:
provision a pass-band of the super-channel to enable data flow between trail-end points of the super-channel; and
control attenuation level of the pass-band to set a launch power of the super-channel on a line fiber.

* * * * *